US012784280B2

(12) United States Patent
Shi et al.

(10) Patent No.: US 12,784,280 B2
(45) Date of Patent: Nov. 3, 2026

(54) ENCODING AND DECODING METHOD, APPARATUS, AND DEVICE, STORAGE MEDIUM, COMPUTER PROGRAM, AND COMPUTER PROGRAM PRODUCT

(71) Applicant: HUAWEI TECHNOLOGIES CO., LTD., Shenzhen (CN)

(72) Inventors: Yibo Shi, Beijing (CN); Jing Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 18/521,067

(22) Filed: Nov. 28, 2023

(65) Prior Publication Data

US 2024/0095964 A1 Mar. 21, 2024

Related U.S. Application Data

(63) Continuation of application No. PCT/CN2022/095149, filed on May 26, 2022.

(30) Foreign Application Priority Data

May 29, 2021 (CN) ......................... 202110596003.6

(51) Int. Cl.
*G06N 3/088* (2023.01)
*G06N 3/0455* (2023.01)
(Continued)

(52) U.S. Cl.
CPC ...................................... *G06T 9/00* (2013.01)

(58) Field of Classification Search
CPC ........... G06T 9/00; G06T 9/002; G06N 3/088; G06N 3/0455; G06N 3/0464; G06N 3/047;
(Continued)

(56) References Cited

U.S. PATENT DOCUMENTS

2020/0160565 A1 5/2020 Ma et al.

FOREIGN PATENT DOCUMENTS

CN 110602494 A * 12/2019 ........... H04N 19/169
CN 111641832 A * 9/2020 ........... H04N 19/124

OTHER PUBLICATIONS

Li, Efficient and Effective Context-Based Convolutional Entropy Modeling for Image Compression, arXiv: 1906.10057v2 [eess.IV] Mar. 28, 2020 (Year: 2020).*

(Continued)

*Primary Examiner* — Vu Le
*Assistant Examiner* — Lei Zhao
(74) *Attorney, Agent, or Firm* — WOMBLE BOND DICKINSON (US) LLP

(57) ABSTRACT

Embodiments of this application disclose encoding and decoding methods, apparatuses, and devices, a storage medium, and a computer program, which relate to the field of encoding and decoding technologies. In embodiments of this application, in a decoding process, a plurality of feature points are divided into a plurality of groups based on a specified numerical value, and probability distributions of feature points in a same group are determined in parallel to improve decoding efficiency. Correspondingly, in an encoding process, the plurality of feature points are also grouped in a same grouping manner, and first image features of each group of feature points in the plurality of groups are sequentially encoded into a bit stream. To be concise, this solution can break through an efficiency bottleneck caused by serial computing when decoding is performed based on a variational auto-encoder (VAE), thereby effectively improving decoding efficiency.

13 Claims, 9 Drawing Sheets

(51) Int. Cl.
*G06N 3/0464* (2023.01)
*G06N 3/047* (2023.01)
*G06T 9/00* (2006.01)
*H04N 19/13* (2014.01)
*H04N 19/42* (2014.01)
*H04N 19/44* (2014.01)
*H04N 19/91* (2014.01)

(58) Field of Classification Search
CPC ........ H04N 19/13; H04N 19/42; H04N 19/91; H04N 19/44
See application file for complete search history.

(56) References Cited

OTHER PUBLICATIONS

Balaji, Bayesian Inference Concepts & Methods—Math Chapter 12, https://www.studocu.com/en-us/document/carnegie-mellon-university/foundation-probability/bayes-math/9374053, 2017/2018 (Year: 2017).*

David Minnen et al: "Joint autoregressive and hierarchical priors for learned image compression", NIPS''18: Proceedings of the 32nd International Conference on Neural Information Processing Systems, Dec. 3, 2018, total 10 pages.

Mu Li et al: "Efficient and Effective Context-Based Convolutional Entropy Modelling for Image Compression", IEEE Transactions on Image Processing (TIP), Apr. 14, 2020, total 12 pages.

Tong Chen et al,"Neural Image Compression via Non-Local Attention Optimization and Improved Context Modeling" arXiv:1910.06244v1 [eess.IV] Oct. 11, 2019,total 13 pages,XP081514975.

Jing Zhou et al,"Multi-scale and Context-adaptive Entropy Model for Image Compression" arXiv:1910.07844v1 [eess.IV] Oct. 17, 2019,total 4 pages,XP081516959.

David Minnen et al,"Joint Autoregressive and Hierarchical Priors for Learned Image Compression" arXiv:1809.02736v1 [cs. CV] Sep. 8, 2018,total 22 pages,XP080914979.

Haojie Liu et al,"Neural Video Coding using Multiscale Motion Compensation and Spatiotemporal Context Model" arXiv:2007.04574v1[eess.IV] Jul. 9, 2020,total 14 pages,xP081718592.

* cited by examiner

| | | | | | | | | | |
|---|---|---|---|---|---|---|---|---|---|
| 1 | 2 | 3 | 4 | 5 | 6 | 7 | 8 | 9 | 10 |
| 4 | 5 | 6 | 7 | 8 | 9 | 10 | 11 | 12 | 13 |
| 7 | 8 | 9 | 10 | 11 | 12 | 13 | | | |
| 10 | 11 | 12 | 13 | | | | | | |
| 13 | | | | | | | | | |
| | | | | | | | | | |
| | | | | | | | | | |
| | | | | | | | | | |
| | | | | | | | | | |
| | | | | | | | | | |

| | | | | | | | | | |
|---|---|---|---|---|---|---|---|---|---|
| 10 | 13 | | | | | | | | |
| 9 | 12 | | | | | | | | |
| 8 | 11 | | | | | | | | |
| 7 | 10 | 13 | | | | | | | |
| 6 | 9 | 12 | | | | | | | |
| 5 | 8 | 11 | | | | | | | |
| 4 | 7 | 10 | 13 | | | | | | |
| 3 | 6 | 9 | 12 | | | | | | |
| 2 | 5 | 8 | 11 | | | | | | |
| 1 | 4 | 7 | 10 | 13 | | | | | |

FIG. 7

| | | | | | | | | | |
|---|---|---|---|---|---|---|---|---|---|
| 1 | 4 | 7 | 10 | 13 | | | | | |
| 2 | 5 | 8 | 11 | | | | | | |
| 3 | 6 | 9 | 12 | | | | | | |
| 4 | 7 | 10 | 13 | | | | | | |
| 5 | 8 | 11 | | | | | | | |
| 6 | 9 | 12 | | | | | | | |
| 7 | 10 | 13 | | | | | | | |
| 8 | 11 | | | | | | | | |
| 9 | 12 | | | | | | | | |
| 10 | 13 | | | | | | | | |

FIG. 8

ENCODING AND DECODING METHOD, APPARATUS, AND DEVICE, STORAGE MEDIUM, COMPUTER PROGRAM, AND COMPUTER PROGRAM PRODUCT

CROSS-REFERENCE TO RELATED APPLICATIONS

This application is a continuation of International Application No. PCT/CN2022/095149, filed on May 26, 2022, which claims priority to Chinese Patent Application No. 202110596003.6, filed on May 29, 2021. The disclosures of the aforementioned applications are hereby incorporated by reference in their entirety.

TECHNICAL FIELD

Embodiments of this application relate to the field of encoding and decoding technologies, and in particular, to encoding and decoding methods, apparatuses, devices, a storage medium, a computer program, and a computer program product.

BACKGROUND

Image compression technologies can implement effective transmission and storage of image information, and are playing an important role in the current media era where types and data amounts of image information are increasing. An image compression technology includes image encoding and decoding. Encoding and decoding performance (indicating image quality) and encoding and decoding efficiency (indicating time consumption) are factors that need to be considered in the image compression technology.

For related technologies, after long-term research and optimization by technical personnel, currently lossy image compression standards such as JPEG and PNG have been formed. However, these conventional image compression technologies have encountered a bottleneck in improving encoding and decoding performance, and cannot meet ever-increasing requirements of multimedia application data. With wide application of a deep learning technology in fields such as image recognition and object detection, the deep learning technology is also applied to image compression tasks, so that encoding and decoding efficiency is higher than that of a conventional image compression technology. For example, encoding and decoding performance can be greatly improved by using a variational auto-encoder (VAE) based on the deep learning technology to perform image encoding and decoding.

However, in a process of researching an image compression method based on the deep learning technology, how to effectively ensure encoding and decoding performance while improving encoding and decoding efficiency is an issue that deserves attention and a study. For example, in a process of decoding an image by using a VAE according to a related technology, a probability distribution of each feature point of the image is serially computed by using a neural network model, and the image is decoded based on the probability distribution. However, computing of the probability distribution is implemented by the neural network model, and the serial computing causes low decoding efficiency. How to break through an efficiency bottleneck caused by serial computing during decoding without degrading encoding and decoding performance is an issue that deserves attention during the research of VAE-based encoding and decoding methods.

SUMMARY

Embodiments of this application provide encoding and decoding methods, apparatuses, and devices, a storage medium, and a computer program, to break through an efficiency bottleneck caused by serial computing during VAE-based decoding without degrading encoding and decoding performance. Technical solutions are as follows.

According to a first aspect, a decoding method is provided, where the method includes:

- determining, based on a bit stream, a prior feature of each feature point in a plurality of feature points of a to-be-decoded image; dividing the plurality of feature points into a plurality of groups based on a specified numerical value; sequentially determining, based on the prior features of the plurality of feature points, first image features of each group of feature points in the plurality of groups, where determining first image features of any group of feature points is: determining a probability distribution of each feature point in the any group in parallel; and parsing, based on the probability distribution of each feature point in the any group, the bit stream to obtain a first image feature of each feature point in the any group; and reconstructing the image based on the first image features of the plurality of feature points.

In other words, in this embodiment of this application, in a decoding process, a plurality of feature points are divided into a plurality of groups based on a specified numerical value, and probability distributions of feature points in a same group are determined in parallel, to improve decoding efficiency. To be concise, this solution can break through an efficiency bottleneck caused by serial computing when decoding is performed based on a VAE, thereby effectively improving decoding efficiency.

It needs to be noted that, the method is applied to a codec that includes a context model. When any one of the plurality of groups is being decoded, periphery information of all feature points in the any group has been obtained through decoding, that is, feature points in the any group meet a condition that the periphery information has been obtained through decoding.

The plurality of feature points include a first feature point, and the determining a probability distribution of the first feature point includes: if the first feature point is a non-initial feature point in the plurality of feature points, determining periphery information of the first feature point from first image features of decoded feature points, where the first feature point is a feature point in the any group; inputting the periphery information of the first feature point into a context model, to obtain a context feature that is of the first feature point and that is output by the context model; and determining, based on a prior feature of the first feature point and the context feature of the first feature point, the probability distribution of the first feature point.

In an embodiment, the periphery information of the first feature point includes first image features of decoded feature points in a neighborhood that uses the first feature point as a geometric center, a size of the neighborhood is determined based on a size of a receptive field used by the context model, the periphery information includes at least first image features of n feature points around the first feature point, and n is greater than or equal to 4. In other words, to ensure encoding and decoding performance and image quality, this solution uses periphery information as much as possible while ensuring a compression rate.

In an embodiment, the plurality of feature points include a first feature point, and the determining a probability distribution of the first feature point includes: if the first feature point is an initial feature point in the plurality of feature points, determining the probability distribution of the first feature point based on a prior feature of the first feature point.

In an embodiment, the specified numerical value is determined based on the size of the receptive field used by the context model; and the dividing the plurality of feature points into a plurality of groups based on a specified numerical value includes: determining a slope based on the specified numerical value, where the slope indicates a tilt degree of a straight line on which feature points to be divided into a same group are located; and dividing the plurality of feature points into the plurality of groups based on the slope. In other words, in this solution, a group of feature points that can be decoded in parallel is determined based on the size of the receptive field.

In an embodiment, if the context model uses a plurality of receptive fields with different sizes, the specified numerical value is determined based on a size of a largest receptive field in the plurality of receptive fields with different sizes.

In an embodiment, the receptive field used by the context model includes a receptive field whose size is 5*5.

According to a second aspect, an encoding method is provided. The method includes:

determining, based on a to-be-encoded image, a first image feature, a probability distribution, and a first hyper-prior feature of each feature point in a plurality of feature points of the image; dividing the plurality of feature points into a plurality of groups based on a specified numerical value; sequentially encoding, based on the probability distributions of the plurality of feature points, first image features of each group of feature points in the plurality of groups into a bit stream; and encoding the first hyper-prior features of the plurality of feature points into the bit stream.

In other words, in this embodiment of this application, for purpose of determining probability distributions in parallel in a decoding process to improve decoding efficiency, a plurality of feature points are divided into a plurality of groups based on a specified numerical value in an encoding process, and first image features of each group of feature points in the plurality of groups are sequentially encoded into a bit stream. In this way, in the decoding process, grouping is also performed in a same manner, and probability distributions of feature points in a same group are determined in parallel, to improve decoding efficiency. To be concise, this solution can break through an efficiency bottleneck caused by serial computing when decoding is performed based on a VAE, thereby effectively improving decoding efficiency.

In an embodiment, the determining, based on a to-be-encoded image, a first image feature, a probability distribution, and a first hyper-prior feature of each feature point in a plurality of feature points of the image includes: determining, based on the image, first image features of the plurality of feature points; and determining, based on the first image features of the plurality of feature points, first hyper-prior features of the plurality of feature points, and determining the probability distribution of each feature point in the plurality of feature points in parallel.

Corresponding to the decoding method, the method is also applied to a codec that includes a context model. In an embodiment, the plurality of feature points include a first feature point, and the determining a probability distribution of the first feature point includes: if the first feature point is a non-initial feature point in the plurality of feature points, determining a prior feature of the first feature point based on the first image feature of the first feature point, where the first feature point is one of the plurality of feature points; determining periphery information of the first feature point from the first image features of the plurality of feature points; inputting the periphery information of the first feature point into a context model, to obtain a context feature that is of the first feature point and that is output by the context model; and determining, based on the prior feature of the first feature point and the context feature of the first feature point, the probability distribution of the first feature point.

In an embodiment, the plurality of feature points include a first feature point, and the determining a probability distribution of the first feature point includes: if the first feature point is an initial feature point in the plurality of feature points, determining the probability distribution of the first feature point based on a prior feature of the first feature point.

In an embodiment, a specified numerical value is determined based on a size of a receptive field used by a context model; and the dividing the plurality of feature points into a plurality of groups based on a specified numerical value includes: determining a slope based on the specified numerical value, where the slope indicates a tilt degree of a straight line on which feature points to be divided into a same group are located; and dividing the plurality of feature points into the plurality of groups based on the slope.

In an embodiment, if the context model uses a plurality of receptive fields with different sizes, the specified numerical value is determined based on a size of a largest receptive field in the plurality of receptive fields with different sizes.

In an embodiment, the receptive field used by the context model includes a receptive field whose size is 5*5.

According to a third aspect, a decoding apparatus is provided. The decoding apparatus has a function of implementing behavior of the decoding method in the first aspect. The decoding apparatus includes one or more modules, and the one or more modules are configured to implement the decoding method provided in the first aspect.

In other words, a decoding apparatus is provided, and the decoding apparatus includes:

a first determining module, configured to determine, based on a bit stream, a prior feature of each feature point in a plurality of feature points of a to-be-decoded image;

a grouping module, configured to divide the plurality of feature points into a plurality of groups based on a specified numerical value;

a second determining module, configured to sequentially determine, based on the prior features of the plurality of feature points, first image features of each group of feature points in the plurality of groups, where determining first image features of any group of feature points is: determining a probability distribution of each feature point in the any group in parallel; and parsing, based on the probability distribution of each feature point in the any group, the bit stream to obtain a first image feature of each feature point in the any group; and a reconstruction module, configured to reconstruct the image based on the first image features of the plurality of feature points.

In an embodiment, the plurality of feature points include a first feature point, and the second determining module includes:

a first processing submodule, configured to: if the first feature point is a non-initial feature point in the plurality of feature points, determine periphery information of the first feature point from first image features of decoded feature points, where the first feature point is a feature point in the any group;

a second processing submodule, configured to input the periphery information of the first feature point into a context model, to obtain a context feature that is of the first feature point and that is output by the context model; and a third processing submodule, configured to determine, based on a prior feature of the first feature point and the context feature of the first feature point, the probability distribution of the first feature point.

In an embodiment, the periphery information of the first feature point includes first image features of decoded feature points in a neighborhood that uses the first feature point as a geometric center, a size of the neighborhood is determined based on a size of a receptive field used by the context model, the periphery information includes at least first image features of n feature points around the first feature point, and n is greater than or equal to 4.

In an embodiment, the plurality of feature points include a first feature point, and the second determining module includes:

a fourth processing submodule, configured to: if the first feature point is an initial feature point in the plurality of feature points, determine the probability distribution of the first feature point based on the prior feature of the first feature point.

In an embodiment, the specified numerical value is determined based on a size of a receptive field used by the context model; and the grouping module includes:

a first determining submodule, configured to determine a slope based on the specified numerical value, where the slope indicates a tilt degree of a straight line on which feature points to be divided into a same group are located; and a division submodule, configured to divide the plurality of feature points into the plurality of groups based on the slope.

In an embodiment, if the context model uses a plurality of receptive fields with different sizes, the specified numerical value is determined based on a size of a largest receptive field in the plurality of receptive fields with different sizes.

In an embodiment, the receptive field used by the context model includes a receptive field whose size is 5*5.

According to a fourth aspect, an encoding apparatus is provided. The encoding apparatus has a function of implementing behavior of the encoding method in the second aspect. The encoding apparatus includes one or more modules, and the one or more modules are configured to implement the encoding method provided in the second aspect.

In other words, an encoding apparatus is provided, and the apparatus includes:

a first determining module, configured to determine, based on a to-be-encoded image, a first image feature, a probability distribution, and a first hyper-prior feature of each feature point in a plurality of feature points of the image;

a grouping module, configured to divide the plurality of feature points into a plurality of groups based on a specified numerical value;

a first encoding module, configured to sequentially encode, based on the probability distributions of the plurality of feature points, first image features of each group of feature points in the plurality of groups into a bit stream; and a second encoding module, configured to encode the first hyper-prior features of the plurality of feature points into the bit stream.

In an embodiment, the first determining module includes:

a first determining submodule, configured to determine, based on the image, first image features of the plurality of feature points; and a second determining submodule, configured to: determine, based on the first image features of the plurality of feature points, first hyper-prior features of the plurality of feature points, and determine the probability distribution of each feature point in the plurality of feature points in parallel.

In an embodiment, the plurality of feature points include a first feature point, and the second determining submodule is configured to:

if the first feature point is a non-initial feature point in the plurality of feature points, determine a prior feature of the first feature point based on the first image feature of the first feature point, where the first feature point is one of the plurality of feature points;

determine periphery information of the first feature point from the first image features of the plurality of feature points;

input the periphery information of the first feature point into a context model, to obtain a context feature that is of the first feature point and that is output by the context model; and determine, based on a prior feature of the first feature point and the context feature of the first feature point, the probability distribution of the first feature point.

In an embodiment, the plurality of feature points include a first feature point, and the second determining submodule is configured to:

if the first feature point is an initial feature point in the plurality of feature points, determine the probability distribution of the first feature point based on a prior feature of the first feature point.

In an embodiment, the specified numerical value is determined based on a size of a receptive field used by the context model; and the grouping module includes:

a third determining submodule, configured to determine a slope based on the specified numerical value, where the slope indicates a tilt degree of a straight line on which feature points to be divided into a same group are located; and a division submodule, configured to divide the plurality of feature points into the plurality of groups based on the slope.

In an embodiment, if the context model uses a plurality of receptive fields with different sizes, the specified numerical value is determined based on a size of a largest receptive field in the plurality of receptive fields with different sizes.

In an embodiment, the receptive field used by the context model includes a receptive field whose size is 5*5.

According to a fifth aspect, a decoder-side device is provided. The decoder-side device includes a processor and a memory. The memory is configured to store a program for performing the decoding method provided in the first aspect, and the processor is configured to execute the program stored in the memory, to implement the decoding method provided in the first aspect.

In an embodiment, the decoder-side device may further include a communications bus. The communications bus is configured to establish a connection between the processor and the memory.

According to a sixth aspect, an encoder-side device is provided. The encoder-side device includes a processor and a memory. The memory is configured to store a program for performing the encoding method provided in the second aspect, and the processor is configured to execute the program stored in the memory, to implement the encoding method provided in the second aspect.

In an embodiment, the encoder-side device may further include a communications bus. The communications bus is configured to establish a connection between the processor and the memory.

According to a seventh aspect, a computer-readable storage medium is provided. The storage medium stores instructions. When the instructions are run on a computer, the computer is enabled to perform operations of the decoding method according to the first aspect or perform operations of the encoding method according to the second aspect.

According to an eighth aspect, a computer program product including instructions is provided. When the instructions are run on a computer, the computer is enabled to perform operations of the decoding method according to the first aspect, or perform operations of the encoding method according to the second aspect. In other words, a computer program is provided; and when the computer program is executed, operations of the decoding method according to the first aspect or operations of the encoding method according to the second aspect are implemented.

Technical effects obtained according to the third aspect, the fourth aspect, the fifth aspect, the sixth aspect, the seventh aspect, and the eighth aspect are similar to technical effects obtained by using corresponding technical means in the first aspect or the second aspect. Details are not described herein again.

The technical solutions provided in embodiments of this application can bring at least the following beneficial effects:

in embodiments of this application, in a decoding process, a plurality of feature points are divided into a plurality of groups based on a specified numerical value, and probability distributions of feature points in a same group are determined in parallel to improve decoding efficiency. Correspondingly, in an encoding process, the plurality of feature points are also grouped in a same grouping manner, and first image features of each group of feature points in the plurality of groups are sequentially encoded into a bit stream. To be concise, this solution can break through an efficiency bottleneck caused by serial computing when decoding is performed based on a VAE, thereby effectively improving decoding efficiency.

BRIEF DESCRIPTION OF DRAWINGS

FIG. 7 is a schematic diagram of still another encoding/decoding sequence according to an embodiment of this application;

FIG. 8 is a schematic diagram of yet another encoding/decoding sequence according to an embodiment of this application;

DESCRIPTION OF EMBODIMENTS

To make the objectives, technical solutions, and advantages of embodiments of this application clearer, the following further describes the embodiments of this application in detail with reference to the accompanying drawings.

A network architecture and a service scenario described in embodiments of this application are intended to describe the technical solutions in embodiments of this application more clearly, and do not constitute a limitation on the technical solutions provided in embodiments of this application. A person of ordinary skill in the art may learn that, with evolution of network architectures and emergence of new service scenarios, the technical solutions provided in embodiments of this application are also applicable to similar technical issues.

Before the encoding and decoding methods provided in embodiments of this application are explained and described in detail, terms and an implementation environment involved in embodiments of this application are first described below.

For ease of understanding, terms involved in embodiments of this application are first explained as follows:

pixel depth (bits per pixel, BPP): also referred to as bit/pixel, BPP is a quantity of bits used to store each pixel, where a smaller BPP indicates a smaller compression bit rate;

bit rate: in image compression, a bit rate refers to an encoding length required for encoding a unit pixel, where a higher bit rate indicates better image reconstructing quality;

- peak signal-to-noise ratio (PSNR): an objective standard for evaluating image quality, where a higher PSNR indicates better image quality;
- multi-scale structure similarity index measure (MS-SSIM): an objective standard for evaluating an image, where a higher MS-SSIM indicates better image quality;
- convolutional neural network (CNN): as a feedforward neural network that includes convolutional computing and has a deep structure, it is one of representative algorithms for deep learning; and
- variational auto-encoder (VAE): an automatic encoder for data compression or de-noising.

Next, an implementation environment involved in embodiments of this application is described as follows.

Figure 1:
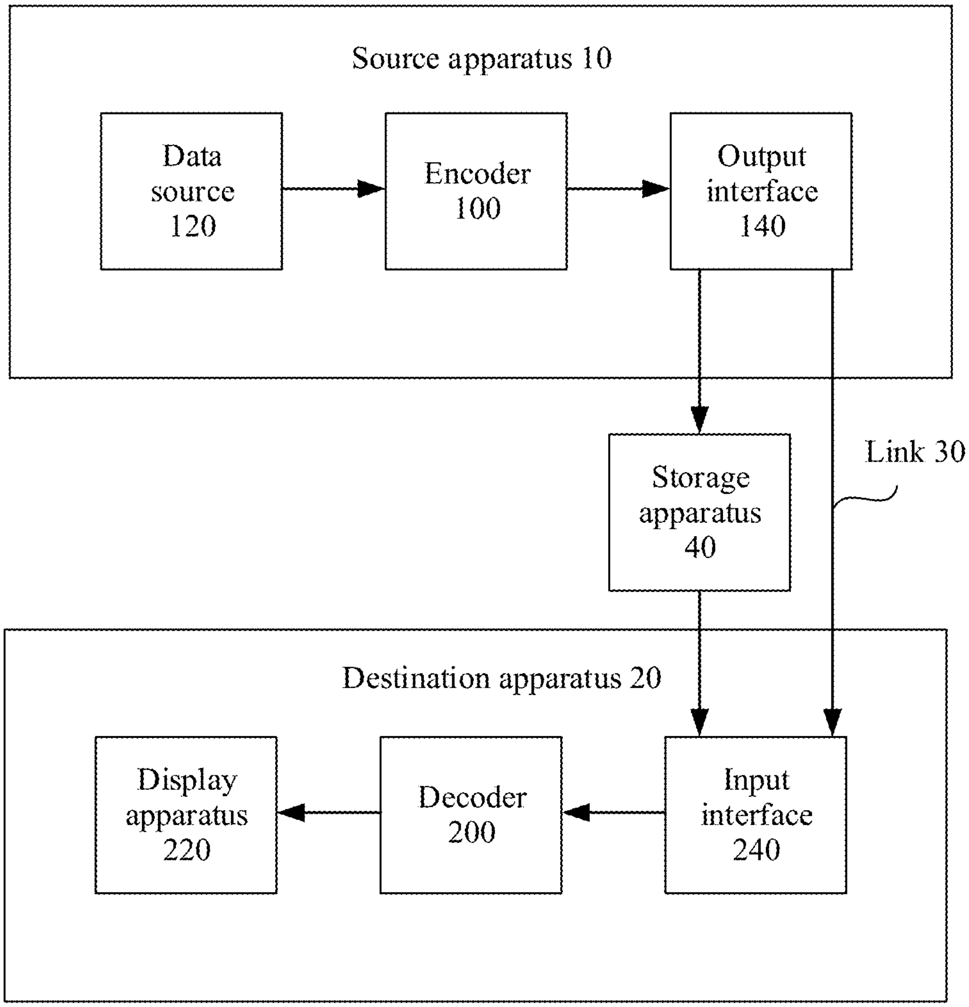
FIG. 1 is a schematic diagram of an implementation environment according to an embodiment of this application.

Refer to FIG. 1. FIG. 1 is a schematic diagram of an implementation environment according to an embodiment of this application. The implementation environment includes a source apparatus 10, a destination apparatus 20, a link 30, and a storage apparatus 40. The source apparatus 10 may generate an encoded image. Therefore, the source apparatus 10 may be referred to as an image encoding apparatus. The destination apparatus 20 may decode the encoded image generated by the source apparatus 10. Therefore, the destination apparatus 20 may also be referred to as an image decoding apparatus. The link 30 may receive the encoded image generated by the source apparatus 10, and may transmit the encoded image to the destination apparatus 20. The storage apparatus 40 may receive the encoded image generated by the source apparatus 10, and may store the encoded image; and in this case, the destination apparatus 20 may directly obtain the encoded image from the storage apparatus 40. Alternatively, the storage apparatus 40 may correspond to a file server or another intermediate storage apparatus that can store the encoded image generated by the source apparatus 10; and in this case, the destination apparatus 20 may perform streaming transmission of or download the encoded image stored in the storage apparatus 40.

Both the source apparatus 10 and the destination apparatus 20 may include one or more processors and a memory coupled to the one or more processors. The memory may include a random access memory (RAM), a read-only memory (ROM), an electrically erasable programmable read-only memory (EEPROM), a flash memory, any other medium that may be configured to store, in a form of instructions or a data structure accessible to a computer, required program code, or the like. For example, the source apparatus 10 and the destination apparatus 20 may both include a mobile phone, a smartphone, a personal digital assistant (PDA), a wearable device, a pocket PC (PPC), a tablet computer, a smart in-vehicle terminal, a smart television, a smart sound box, a desktop computer, a mobile computing apparatus, a notebook (for example, a laptop) computer, a set-top box, a handheld telephone such as a so-called "smart" phone, a television, a camera, a display apparatus, a digital media player, a video game console, an on-board computer, or the like.

The link 30 may include one or more media or apparatuses capable of transmitting an encoded image from the source apparatus 10 to the destination apparatus 20. In an embodiment, the link 30 may include one or more communications media that enable the source apparatus 10 to send, in real time, an encoded image directly to the destination apparatus 20. In this embodiment of this application, the source apparatus 10 may modulate, based on a communications standard, an encoded image, where the communications standard may be a wireless communications protocol or the like; and may send the modulated image to the destination apparatus 20. The one or more communications media may include a wireless communications medium and/or a wired communications medium. For example, the one or more communications media may include a radio frequency (RF) spectrum, or one or more physical transmission lines. The one or more communications media may form a part of a packet-based network. The packet-based network may be a local area network, a wide area network, a global network (for example, Internet), or the like. The one or more communications media may include a router, a switch, a base station, another device that facilitates communications from the source apparatus 10 to the destination apparatus 20, or the like. This is not specifically limited in this embodiment of this application.

In an embodiment, the storage apparatus 40 may store a received encoded image sent by the source apparatus 10, and the destination apparatus 20 may directly obtain the encoded image from the storage apparatus 40. In this case, the storage apparatus 40 may include any one of a plurality of distributed or locally accessed data storage media. For example, the any one of a plurality of distributed or locally accessed data storage media may be a hard disk drive, a Blu-ray disc, a digital versatile disc (DVD), a compact disc read-only memory (CD-ROM), a flash memory, a volatile or non-volatile memory, or any other suitable digital storage medium configured to store an encoded image.

In an embodiment, the storage apparatus 40 may correspond to a file server or another intermediate storage apparatus that can store an encoded image generated by the source apparatus 10; and the destination apparatus 20 may perform streaming transmission of or download the encoded image stored in the storage apparatus 40. The file server may be any type of server that can store an encoded image and send the encoded image to the destination apparatus 20. In an embodiment, the file server may include a network server, a File Transfer Protocol (FTP) server, a network attached storage (NAS) apparatus, a local disk drive, or the like. The destination apparatus 20 may obtain the encoded image by using any standard data connection (including an Internet connection). The any standard data connection may include a wireless channel (for example, a Wi-Fi connection), a wired connection (for example, a digital subscriber line (DSL) or a cable modem), or a combination of a wireless channel and a wired connection that are suitable for obtaining an encoded image stored on the file server. Transmission of an encoded image from the storage apparatus 40 may be streaming transmission, transmission in a download manner, or a combination of the two.

The implementation environment shown in FIG. 1 is merely an embodiment. In addition, the technologies in embodiments of this application are applicable to not only the source apparatus 10 capable of encoding an image and the destination apparatus 20 capable of decoding the encoded image as shown in FIG. 1, but also another apparatus capable of encoding an image and decoding the encoded image. This is not specifically limited in embodiments of this application.

In the implementation environment shown in FIG. 1, the source apparatus 10 includes a data source 120, an encoder 100, and an output interface 140. In some embodiments, the output interface 140 may include a modulator/demodulator (modem) and/or a sender. The sender may also be referred to as a transmitter. The data source 120 may include an image capturing apparatus (for example, a camera), archives containing previously captured images, a feed interface for receiving images from an image content provider, and/or a computer graphics system for generating images, or a combination of these sources of images.

The data source 120 may send an image to the encoder 100, and the encoder 100 may encode the received image sent by the data source 120, to obtain an encoded image. The encoder may send the encoded image to the output interface 140. In some embodiments, the source apparatus 10 sends an encoded image directly to the destination apparatus 20 through the output interface 140. In another embodiment, the encoded image may alternatively be stored on the storage apparatus 40, for the destination apparatus 20 to obtain later for decoding and/or displaying.

In the implementation environment shown in FIG. 1, the destination apparatus 20 includes an input interface 240, a decoder 200, and a display apparatus 220. In some embodiments, the input interface 240 includes a receiver and/or a modem. The input interface 240 may receive an encoded image through the link 30 and/or from the storage apparatus 40, and then send the encoded image to the decoder 200. The decoder 200 may decode the received encoded image to obtain a decoded image. The decoder 200 may send the decoded image to the display apparatus 220. The display apparatus 220 may be integrated with the destination apparatus 20 or may be external to the destination apparatus 20. Generally, the display apparatus 220 displays a decoded image. The display apparatus 220 may be a display apparatus of any one of a plurality of types. For example, the display apparatus 220 may be a liquid crystal display (LCD), a plasma display, an organic light-emitting diode (OLED) display, or another type of display apparatus.

Although not shown in FIG. 1, in some aspects, the encoder 100 and the decoder 200 may be respectively integrated with an encoder and a decoder; and may include an appropriate multiplexer-demultiplexer (MUX-DEMUX) unit or other hardware and software for encoding both audio and videos in a shared data stream or separate data streams. In some embodiments, if applicable, the MUX-DEMUX unit may comply with the ITU H.223 multiplexer protocol or another protocol such as a User Datagram Protocol (UDP).

The encoder 100 and the decoder 200 each may be any one of the following circuits: one or more microprocessors, a digital signal processor (DSP), an application-specific integrated circuit (ASIC), a field-programmable gate array (FPGA), discrete logic, hardware, or any combination thereof. If the technologies in embodiments of this application are implemented partially in software, the apparatus may store, in an appropriate non-volatile computer-readable storage medium, instructions used for the software, and may use one or more processors to execute the instructions in hardware, to implement the technologies in embodiments of this application. Any of the foregoing content (including hardware, software, and a combination of hardware and software) may be considered as one or more processors. Each of the encoder 100 and the decoder 200 may be included in one or more encoders or decoders. Any one of the encoders or the decoders may be integrated as a part of a composite encoder/decoder (codec) in a corresponding apparatus.

In some embodiments, the encoder 100 may be generally referred to as "signaling" or "sending" some information to another apparatus, for example, the decoder 200. The term "signaling" or "sending" may generally refer to transmission of a syntax element used to decode a compressed image and/or transmission of other data. Such transmission may occur in real time or almost real time. Alternatively, such communications may occur after a period of time, for example, may occur when a syntax element in an encoded bit stream is stored in a computer-readable storage medium during encoding. The decoding apparatus may then retrieve the syntax element at any time after the syntax element is stored in the medium.

The encoding and decoding methods provided in embodiments of this application may be applied to a plurality of scenarios. In various scenarios, an image to be encoded or decoded may be an image included in an image file, or may be an image included in a video file. It needs to be noted that, with reference to the implementation environment shown in FIG. 1, any one of the following encoding methods may be performed by the encoder 100 in the source apparatus 10; and any one of the following decoding methods may be performed by the decoder 200 in the destination apparatus 20.

It needs to be noted that, the encoding and decoding methods provided in embodiments of this application may be applied to encoding and decoding methods provided in a video and image compression framework of any VAE method. Next, an encoding and decoding model of a basic VAE method is described as follows.

Figure 2:
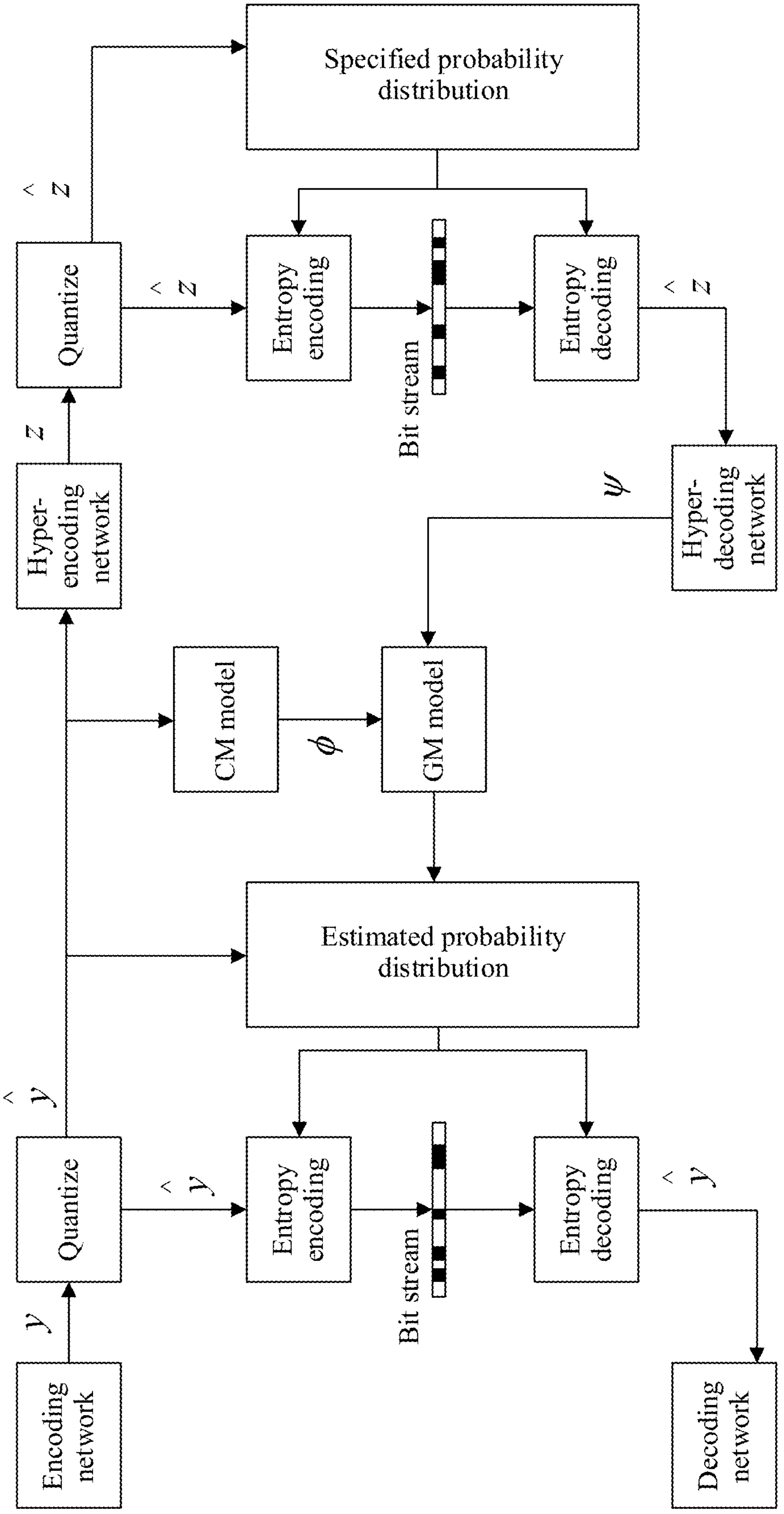
FIG. 2 is a schematic diagram of a structure of an encoding and decoding framework according to an embodiment of this application.

Refer to FIG. 2. On an encoder side, an original image is input into an encoding network model, to extract features and obtain to-be-quantized image features y of a plurality of feature points. The to-be-quantized image features y are also referred to as second image features y in embodiments of this application. The second image features y of the plurality of feature points are quantized to obtain first image features $\hat{y}$ of the plurality of feature points. The first image features $\hat{y}$ of the plurality of feature points are input into a hyper-encoding network model, to obtain to-be-quantized hyper-prior features z of the plurality of feature points. The to-be-quantized hyper-prior features z are also referred to as second hyper-prior features z in embodiments of this application. The second hyper-prior features z of the plurality of feature points are quantized to obtain first hyper-prior features $\hat{z}$ of the plurality of feature points. Then entropy encoding is performed on the first hyper-prior features $\hat{z}$ of the plurality of feature points based on a specified probability distribution, to encode the first hyper-prior features $\hat{z}$ into a bit stream. As shown in FIG. 2, a bit sequence obtained by performing entropy encoding on the first hyper-prior features $\hat{z}$ is a part of bit sequences included in the bit stream, and this bit sequence (as shown by a black and white bar on the right in FIG. 2) may be referred to as a hyper-prior bit stream.

In addition, the first hyper-prior features $\hat{z}$ of the plurality of feature points are input into a hyper-decoding network model, to obtain prior features $\psi$ of the plurality of feature points. The first image features $\hat{y}$ of the plurality of feature points are input into a context model (context model, CM), to obtain context features $\phi$ of the plurality of feature points. Probability distributions $N(\mu,\sigma)$ of the plurality of feature points are estimated by using a probability distribution estimation model (where a gather model, GM, is shown in the figure) in combination with the prior features $\psi$ and the context features $\phi$ of the plurality of feature points, and a first image feature $\hat{y}$ of each feature point in the plurality of feature points is sequentially encoded into the bit stream based on the probability distributions $N(\mu,\sigma)$ of the plurality of feature points. As shown in FIG. 2, a bit sequence obtained by performing entropy encoding on the first image features $\hat{y}$ is a part of bit sequences included in the bit stream, and this bit sequence (as shown by a black and white bar on the left in FIG. 2) may be referred to as an image bit stream.

On a decoder side, entropy decoding is first performed, based on the specified probability distribution, on the hyper-prior bit stream included in the bit stream, to obtain the first hyper-prior features $\hat{z}$ of the plurality of feature points, and the first hyper-prior features $\hat{z}$ of the plurality of feature points are input into a hyper-decoding network model, to obtain the prior features $\psi$ of the plurality of feature points. For an initial feature point in the plurality of feature points, a probability distribution of the initial feature point is estimated based on a prior feature of the initial feature point; and the image bit stream included in the bit stream is parsed based on the probability distribution of the initial feature point, to obtain a first image feature of the initial feature point. For a non-initial feature point in the plurality of feature points, for example, a first feature point, periphery information of the first feature point is determined from first image features of decoded feature points; the periphery information of the first feature point is input into a context model (CM) to obtain a context feature of the first feature point; a probability distribution of the first feature point is estimated by using a probability distribution estimation model (GM) in combination with a prior feature of the first feature point and the context feature of the first feature point; and the image bit stream included in the bit stream is parsed based on the probability distribution of the first feature point, to obtain a first image feature of the first feature point. After the first image features $\hat{y}$ of the plurality of feature points are obtained through entropy decoding from the bit stream, the first image features $\hat{y}$ are input into a decoding network model to obtain a reconstructed image.

Figure 3:
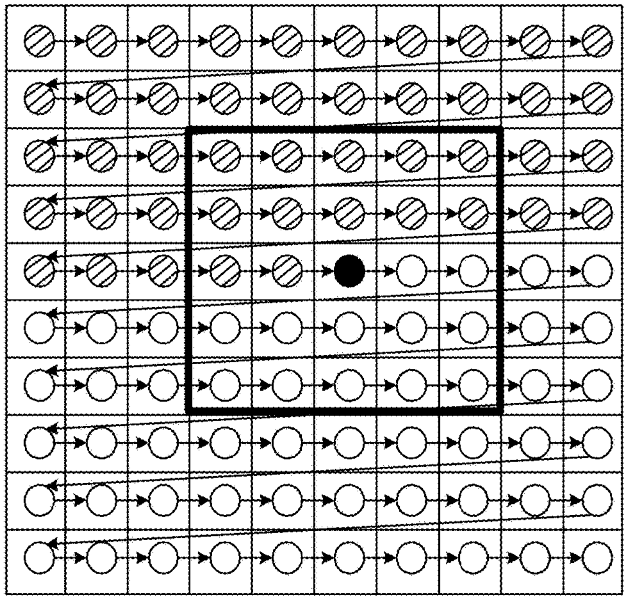
FIG. 3 is a schematic diagram of an encoding/decoding sequence according to an embodiment of this application.

For a computing process in which the probability distributions of the plurality of feature points are estimated, in a related technology, both an encoder-side device and a decoder-side device sequentially compute a probability distribution of each feature point in the plurality of feature points. As shown in FIG. 3, in the related technology, a probability distribution of each feature point is sequentially estimated on a decoder side according to a sequence indicated by an arrow in FIG. 3, and a first image feature of each feature point is encoded on an encoder side into a bit stream according to a sequence indicated by the arrow in FIG. 3. In addition, as shown in FIG. 3, in the related technology, it is assumed that a feature point filled with black is being decoded on a current decoder side, and feature points filled with slashes are decoded feature points. For the feature point filled with black, periphery information of the feature point includes first image features of twelve feature points filled with slashes in a black thick box.

It can be learned from the foregoing description that, an encoding and decoding model of a VAE method includes two parts: one part is a feature extraction and decoding module, and the other part is an entropy encoding module. In the entropy encoding module, context information (that is, periphery information) and hyper-prior information are introduced, so that compression performance can be greatly improved.

Next, an encoding method provided in an embodiment of this application is described as follows.

Figure 4:
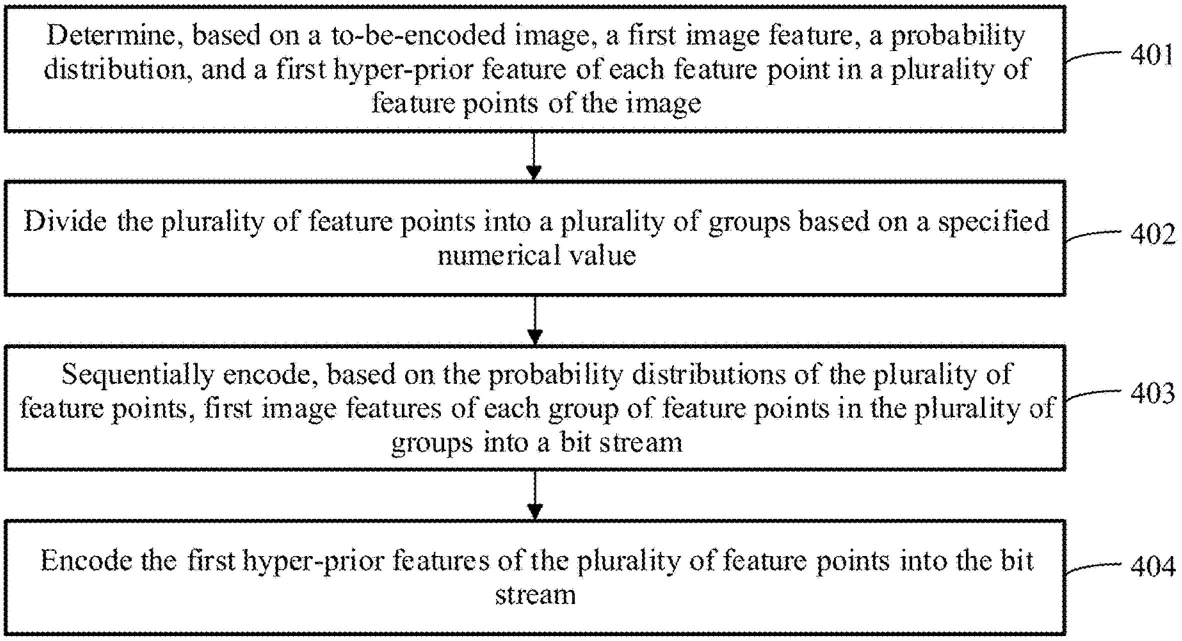
FIG. 4 is a flowchart of an encoding method according to an embodiment of this application.

Refer to FIG. 4. FIG. 4 is a flowchart of an encoding method according to an embodiment of this application. The encoding method is applied to an encoder-side device. The encoding method includes the following operations.

Operation 401: Determine, based on a to-be-encoded image, a first image feature, a probability distribution, and a first hyper-prior feature of each feature point in a plurality of feature points of the image.

The to-be-encoded image is an image in an image file or an image in a video file, and a form of the to-be-encoded image may be any form. This is not limited in this embodiment of this application.

In this embodiment of this application, an implementation process of determining, based on a to-be-encoded image, a first image feature, a probability distribution, and a first hyper-prior feature of each feature point in a plurality of feature points of the image includes: determining, based on the image, first image features of the plurality of feature points; and determining, based on the first image features of the plurality of feature points, first hyper-prior features of the plurality of feature points, and determining the probability distribution of each feature point in the plurality of feature points in parallel.

An implementation process of determining, based on the image, first image features of the plurality of feature points is: inputting the image into an encoding network model, to obtain second image features that are of the plurality of feature points and that are output by the encoding network model, and performing quantization processing on the second image features of the plurality of feature points, to obtain the first image features of the plurality of feature points.

An implementation process of determining, based on the first image features of the plurality of feature points, first hyper-prior features of the plurality of feature points is: inputting the first image features of the plurality of feature points into a hyper-encoding network model, to obtain second hyper-prior features that are of the plurality of feature points and that are output by the hyper-encoding network model, and performing quantization processing on the second hyper-prior features of the plurality of feature points, to obtain the first hyper-prior features of the plurality of feature points.

There may be a plurality of quantization processing manners in the foregoing implementation processes. For example, a quantization step of scalar quantization or variable quantization may be determined based on different encoding rates. In other words, a correspondence between an encoding rate and a quantization step is stored in advance, and a corresponding quantization step is obtained from the correspondence based on an encoding rate used in this embodiment of this application. In addition, there may be an offset for scalar quantization. To be specific, offset processing is performed on to-be-quantized data (for example, the second image features or the second hyper-prior features) by using the offset, and then scalar quantization is performed based on a quantization step.

It needs to be noted that the following quantization processing manner is similar to the manner herein. For a quantization processing manner to follow later, refer to the manner herein. Details are not described later in this embodiment of this application.

The plurality of feature points include a first feature point, and an implementation process of determining a probability distribution of the first feature point is: if the first feature point is a non-initial feature point in the plurality of feature points, determining a prior feature of the first feature point based on the first image feature of the first feature point; determining periphery information of the first feature point from the first image features of the plurality of feature points; inputting the periphery information of the first feature point into a context model, to obtain a context feature that is of the first feature point and that is output by the context model; and determining, based on the prior feature of the first feature point and the context feature of the first feature point, the probability distribution of the first feature point, where the first feature point is one of the plurality of feature points.

An implementation process of determining a prior feature of the first feature point based on the first image feature of the first feature point is: determining a first hyper-prior feature of the first feature point based on the first image feature of the first feature point, and determining the prior feature of the first feature point based on the first hyper-prior feature of the first feature point. It needs to be noted that, an implementation process of determining a first hyper-prior feature of the first feature point is the implementation process of determining a first hyper-prior feature of any feature point in the plurality of feature points. The process has been described previously, and details are not described herein again. An implementation process of determining the prior feature of the first feature point based on the first hyper-prior feature of the first feature point is: inputting the first hyper-prior feature of the first feature point into a hyper-decoding network model, to obtain a prior feature that is of the first feature point and that is output by the hyper-decoding network model.

The encoding network model, the hyper-encoding network model, and the hyper-decoding network model in the foregoing description are all pre-trained. Network structures and training methods of the encoding network model, the hyper-encoding network model, and the hyper-decoding network model are not limited in this embodiment of this application. For example, network structures of the encoding network model, the hyper-encoding network model, and the hyper-decoding network model each may be a fully-connected network or a convolutional neural network (CNN), and convolution in the convolutional neural network may be 2D convolution or 3D convolution. In addition, in this embodiment of this application, a quantity of layers and a quantity of nodes at each layer included in the network structures of the encoding network model, the hyper-encoding network model, and the hyper-decoding network model are not limited.

In this embodiment of this application, description is made by using an example in which the network structures of the encoding network model, the hyper-encoding network model, and the hyper-decoding network model each are a CNN, and convolution in the CNNs is 2D convolution. The second image features of the plurality of feature points output by the encoding network model are represented by a matrix of C*W*H dimensions, and the first image features of the plurality of feature points obtained through quantization processing are also represented by a matrix of C*W*H dimensions, where C is a quantity of channels of the CNN, and W*H indicates a size of a feature map that includes the plurality of feature points. Correspondingly, the second hyper-prior features of the plurality of feature points obtained based on the hyper-encoding network model, the first hyper-prior features of the plurality of feature points obtained through quantization processing, and the prior features of the plurality of feature points obtained based on the hyper-decoding network model each are represented by a matrix of C*W*H dimensions.

In addition, the context model in this embodiment of this application is also pre-trained. A network structure of the context model and a training method of the context model are not limited in this embodiment of this application. For example, the network structure of the context model may be a mask region CNN (Mask R-CNN), where a receptive field is used in the Mask R-CNN to extract a context feature, one or more receptive fields may be used in the context model, and sizes of the receptive fields in the one or more receptive fields are different. This is not limited in this embodiment of this application. In an embodiment, in this embodiment of this application, a receptive field used in the context model include a receptive field whose size is 5*5. In addition, convolution in the context model may be 2D convolution or 3D convolution. Assuming that convolution in the context model is 2D convolution, a size of the receptive field may be 3*3, 5*5, 7*7, or the like.

It needs to be noted that the periphery information of the first feature point is an image feature that needs to be used to determine the context feature of the first feature point. In an embodiment, an implementation process of determining periphery information of the first feature point from the first image features of the plurality of feature points is: determining, based on a preset rule, the periphery information of the first feature point from the first image features of the plurality of feature points. In an embodiment, the periphery information of the first feature point includes first image features of decoded feature points in a neighborhood that uses the first feature point as a geometric center, a size of the neighborhood is determined based on a size of a receptive field used by the context model, the periphery information includes at least first image features of n feature points around the first feature point, and n is greater than or equal to 4.

Figures 5, 6:
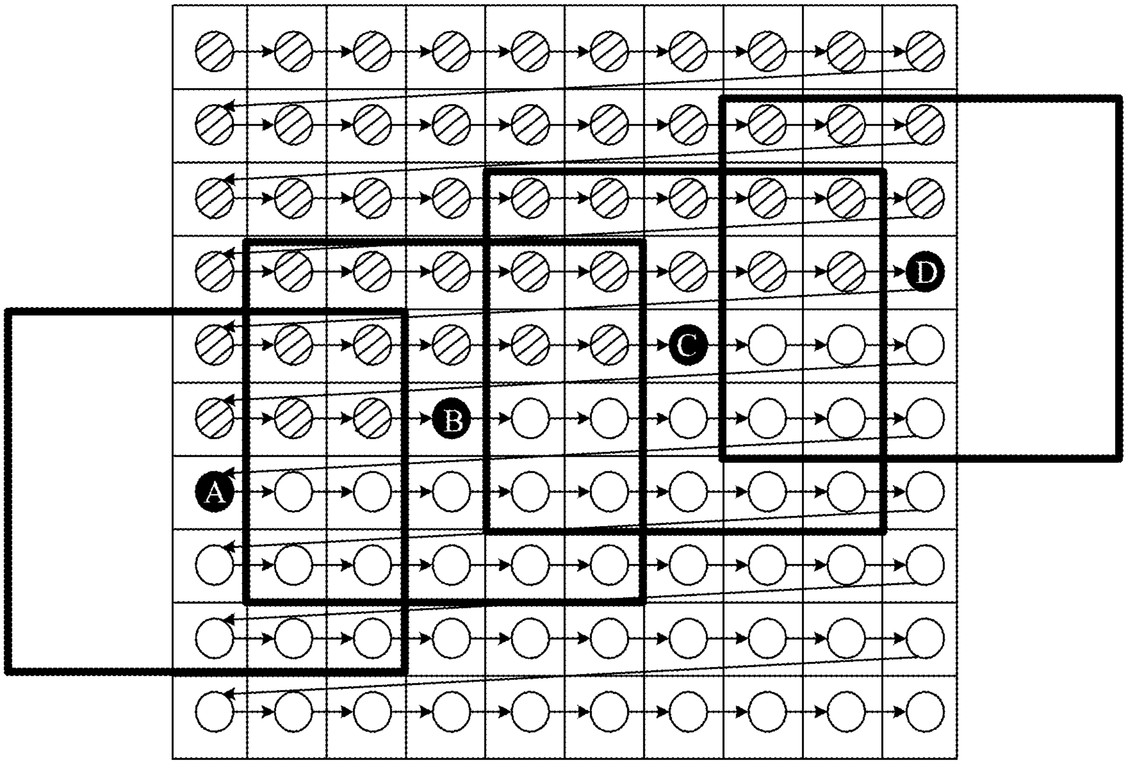
FIG. 5 is a schematic diagram of using periphery information during encoding according to an embodiment of this application.
FIG. 6 is a schematic diagram of another encoding/decoding sequence according to an embodiment of this application.

For example, with reference to FIG. 5, it is assumed that the context model uses a receptive field whose size is 5*5, and convolution in the context model is 2D convolution. In this case, the size of the neighborhood is 5*5. Periphery information of a feature point A determined based on the preset rule includes first image features of six feature points that are in a thick line box and that use the feature point A as a geometric center, and the six feature points are located above (including right above and oblique above) the feature point A. Periphery information of a feature point B includes first image features of twelve feature points that are in a thick line box and that use the feature line B as a geometric center, and the twelve feature points are two feature points on the right left of the feature point B and ten feature points above the feature point B. Periphery information of a feature point C also includes first image features of twelve feature points, where locations of the twelve feature points relative to the feature point C are similar to locations of the twelve feature points that correspond to the feature point B relative to the feature point B. Periphery information of a feature point D includes first image features of eight feature points that are in a thick line box and that use the feature point D as a geometric center, and the eight feature points are two feature points on the right left of the feature point D and six feature points above the feature point D.

When the first feature point is a non-initial feature point in the plurality of feature points, periphery information of the first feature point is determined. After the periphery information of the first feature point is determined, the periphery information of the first feature point is input into a context model, to obtain a context feature that is of the first feature point and that is output by the context model. Then the probability distribution of the first feature point is determined based on the prior feature of the first feature point and the context feature of the first feature point.

In an embodiment, an implementation process of determining, based on a prior feature of the first feature point and the context feature of the first feature point, the probability distribution of the first feature point is: inputting the prior feature of the first feature point and the context feature of the first feature point into a probability distribution estimation model, to obtain a probability distribution that is output by the probability distribution estimation model and that is of the first feature point, where the probability distribution is represented by an average value and a standard deviation. The probability distribution estimation model is pre-trained, and a network structure of the probability distribution estimation model is a neural network, for example, a CNN. A quantity of layers and a quantity of nodes at each layer included in the network structure of the probability distribution estimation model are not limited in this embodiment of this application. In an embodiment, the probability distribution estimation model is a GM model described previously.

In addition, if the first feature point is an initial feature point in the plurality of feature points, the probability distribution of the first feature point is determined based on a prior feature of the first feature point. In other words, for the initial feature point, periphery information is not used in an encoding process, or periphery information of the initial feature point is set to 0. It needs to be noted that, if the first feature point is an initial feature point in the plurality of feature points, an implementation process of determining a probability distribution of the initial feature point is: inputting a prior feature of the initial feature point into a probability distribution estimation model, to obtain a probability distribution that is of the initial feature point and that is output by the probability distribution estimation model; or periphery information of the initial feature point is 0, and then an implementation process of determining a probability distribution of the initial feature point is: inputting the periphery information of the initial feature point into a context model, to obtain a context feature that is of the initial feature point and that is output by the context model, where the context feature of the initial feature point is 0; inputting a prior feature of the initial feature point and the context feature 0 of the initial feature point into a probability distribution estimation model, to obtain a probability distribution that is of the initial feature point and that is output by the probability distribution estimation model.

It needs to be noted that, if a plurality of receptive fields are used in the context model, in a process of determining a context feature of each feature point based on the context model, feature extraction is separately performed on periphery information of each feature point based on each receptive field in the plurality of receptive fields, to obtain a plurality of first context features that are of each feature point and that correspond to the corresponding receptive fields, that is, the context feature of each feature point is determined based on a plurality of first context features of the corresponding feature point. The plurality of first context features are in a one-to-one correspondence with the plurality of receptive fields. To be concise, a quantity of used receptive fields is a quantity of first context features obtained for each feature point.

On this basis, in an implementation, the context feature of each feature point includes a plurality of first context features of the corresponding feature point. After the plurality of first context features of each feature point are obtained based on the plurality of receptive fields used in the context model, the context model outputs the plurality of first context features of each feature point; and then a prior feature of each feature point and the plurality of first context features of the corresponding feature point are input into a probability distribution estimation model, to obtain a probability distribution that is of the corresponding feature point and that is output by the probability distribution estimation model. In this implementation, the context feature of each feature point includes a plurality of first context features of the corresponding feature point.

For example, the context model uses three receptive fields whose sizes are respectively 3*3, 5*5, and 7*7. In this case, three first context features are obtained for each feature point, and a prior feature of each feature point and three first context features of the corresponding feature point are input into a probability distribution estimation model, to obtain a probability distribution that is of the corresponding feature point and that is output by the probability distribution estimation model.

In another implementation, after a plurality of first context features of each feature point are obtained based on the plurality of receptive fields used in the context model, the plurality of first context features of each feature point continue to be processed by using the context model, to obtain a context feature that is of the corresponding feature point and that is output by the context model; and then a prior feature of each feature point and the context feature of each feature point are input into a probability distribution estimation model, to obtain a probability distribution that is of the corresponding feature point and that is output by the probability distribution estimation model. In this implementation, the context feature of each feature point is a context feature obtained by combining a plurality of first context features of the corresponding feature point.

The foregoing describes an implementation process of the determining, based on a to-be-encoded image, a first image feature, a probability distribution, and a first hyper-prior feature of each feature point in a plurality of feature points of the image. In this embodiment of this application, the implementation process is similar to a related process of the VAE method described previously. In this embodiment, after the first image feature of each feature point is obtained, the prior feature of each feature point and the context feature of each feature point are respectively determined based on the first image feature of each feature point; and determining the prior feature and determining the context feature may be considered as two branches, and the two branches may be executed in parallel, to accelerate encoding speed. In addition, the probability distributions of the feature points are determined in parallel, so that encoding efficiency can be ensured.

Operation 402: Divide the plurality of feature points into a plurality of groups based on a specified numerical value.

To perform parallel decoding on feature points on a decoder side to improve decoding efficiency, compared with related VAE-based technologies, this solution has optimized an encoding/decoding sequence of various feature points, so that probability distributions of partial feature points can be determined in parallel. In this embodiment of this application, the plurality of feature points are divided into a plurality of groups based on a specified numerical value, where each group includes at least one feature point. Subsequently, an encoder-side device may sequentially encode first image features of each group of feature points in the plurality of groups into a bit stream according to the following description of operation 403.

The specified numerical value is determined based on a size of a receptive field used by the context model. In an embodiment, if the context model uses a plurality of receptive fields with different sizes, the specified numerical value is determined based on a size of a largest receptive field in the plurality of receptive fields with different sizes.

For example, a convolutional network is used in the encoding process, convolution in the convolutional network is 2D convolution, and the specified numerical value is represented by a symbol ks. If the context model uses a receptive field whose size is 5*5, the specified numerical value ks is equal to 5. If the context model uses receptive fields whose sizes are respectively 3*3, 5*5 and 7*7, the specified numerical value ks is equal to 7.

An implementation process of dividing the plurality of feature points into a plurality of groups based on a specified numerical value is: determining a slope based on the specified numerical value, and dividing the plurality of feature points into the plurality of groups based on the slope. The slope indicates a tilt degree of a straight line on which feature points to be divided into a same group are located. It needs to be noted that, in a grouping method corresponding to 2D convolution, the slope is intuitive. As shown in FIG. 5, feature points A, B, C, and D are grouped into a same group based on this solution. It can be learned that the feature points A, B, C, and D are actually on a straight line, and the slope can indicate a tilt degree of the straight line. However, in an implementation of 3D convolution, the slope is not intuitive. In an embodiment, 2D convolution is used as an example to describe a grouping method. A principle of a grouping method corresponding to 3D convolution is the same as a principle of the grouping method corresponding to 2D convolution.

For example, using 2D convolution as an example, if the specified numerical value ks is equal to 5, the slope k is equal to ⌈ks/2⌉, where ⌈•⌉ represents rounding up. In other words, an implementation of determining the slope based on the specified numerical value is: determining the slope k based on a formula k=⌈ks/2⌉.

2D convolution is still used as an example. It is assumed that the initial feature point is a feature point in an upper left corner of the feature map, and coordinates of the initial feature point are (0, 0). An implementation of dividing the plurality of feature points into the plurality of groups based on the slope is: dividing the plurality of feature points into the plurality of groups based on the slope in a cyclic manner. A $t^{th}$ cycle in the cycle manner includes: if there is an undivided feature point in the plurality of feature points, grouping feature points whose horizontal coordinates are (t−i*k) and vertical coordinates are i in the plurality of feature points into a group, where k is the slope; t, i, and (t−i*k) are all integers; and minimum values of t and i are 0.

Refer to FIG. 6. The initial feature point is a feature point in an upper left corner, and an encoding/decoding sequence number of the initial feature point is 1. In FIG. 6, feature points with a same encoding/decoding sequence number are in a same group. An ascending order of the encoding/decoding sequence numbers is an encoding/decoding sequence of each group in the plurality of groups. A last feature point is a feature point in a lower right corner, and an encoding/decoding sequence number of the last feature point is the largest. It can be learned that the encoding/decoding sequence shown in FIG. 6 starts from the upper left corner, first rightward, and then gradually to the lower right corner.

It may be imagined that, another encoding/decoding sequence shown in FIG. 7 is obtained after FIG. 6 is rotated counterclockwise by 90 degrees. In FIG. 7, the initial feature point is a feature point in a lower left corner of the feature map, the encoding/decoding sequence starts from the lower left corner, first upward, and then gradually to an upper right corner, where a last feature point is a feature point in the upper right corner. Alternatively, mirror transformation is performed based on a diagonal line formed by connecting the upper left corner and the lower right corner in FIG. 6, to obtain another encoding/decoding sequence shown in FIG. 8. In FIG. 8, the initial feature point is a feature point in an upper left corner of the feature map, the encoding/decoding sequence starts from the upper left corner, first downward, and then gradually to a lower right corner, where a last feature point is a feature point in the lower right corner. It can be learned that, according to this solution, a plurality of encoding/decoding sequences can be actually obtained. In an intuitive view, eight encoding/decoding sequences can be obtained by performing rotation and/or mirror transformation on FIG. 6, and the eight encoding/decoding sequences are essentially similar. In all grouping manners corresponding to the eight encoding/decoding sequences, the initial feature point is used as an origin of coordinates, a direction in which the initial feature point points to a second feature point is a horizontal axis, and the other side perpendicular to the horizontal axis in the feature map is a vertical axis, to divide the plurality of feature points into the plurality of groups based on the slope.

For 3D convolution, an implementation of dividing the plurality of feature points into the plurality of groups based on the slope is similar to the implementation corresponding to 2D convolution. A $t^{th}$ cycle in a cyclic manner corresponding to the 3D convolution includes: if there is an undivided feature point in the plurality of feature points, dividing feature points whose coordinates (x, y, z) meet "x+k*y+k*k*z−t=0" in the plurality of feature points into a group, where k is the slope; x, y, z, and t are integers; and minimum values of x, y, z, and t are all 0. In other words, the plurality of feature points are considered as feature points included in a 3D feature map, the 3D feature map includes a plurality of 2D feature maps, a plane on which each 2D feature map is located is parallel to an xy plane, and features divided into a same group are scattered in the 2D feature maps included in the 3D feature map. In this way, spatial parallel encoding and decoding can be implemented, and a degree of parallelism is very high.

Figure 9:
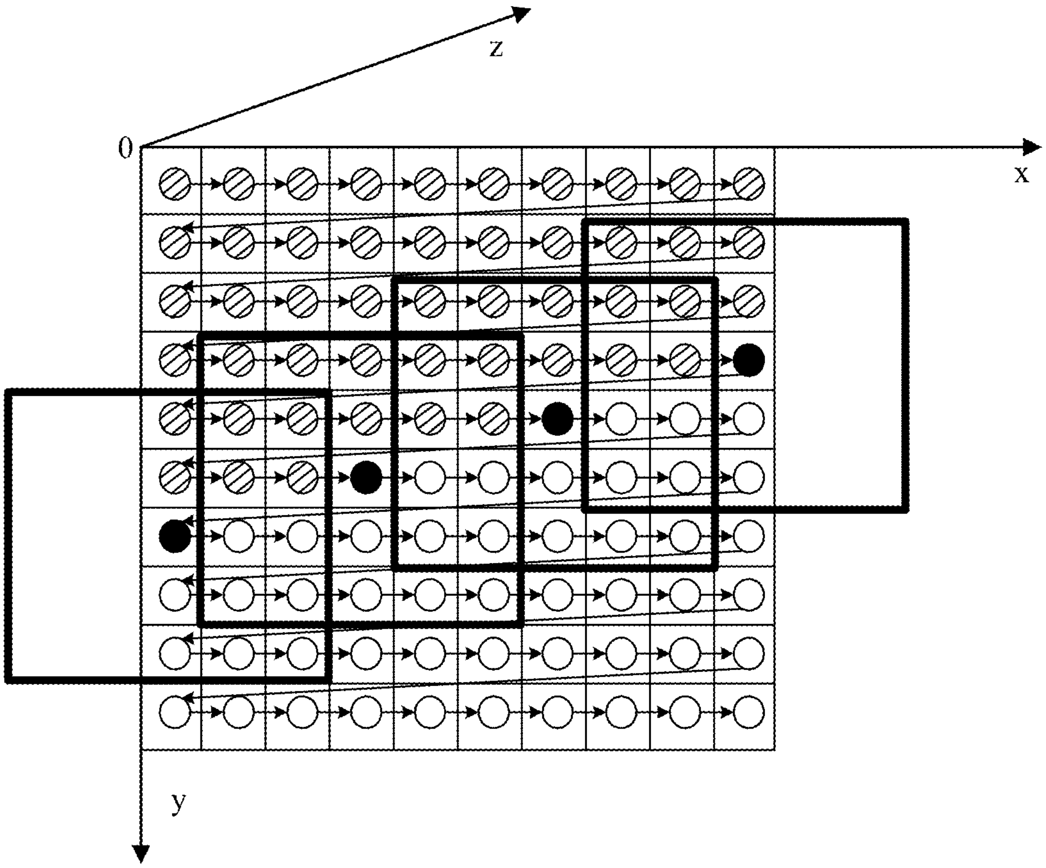
FIG. 9 is a schematic diagram of still yet another encoding/decoding sequence according to an embodiment of this application.

Alternatively, feature points in each of the plurality of 2D feature maps are sequentially grouped in ascending order of z in a manner similar to the grouping manner corresponding to the foregoing 2D convolution. As shown in FIG. 9, feature points on a plane with z=0 are first grouped, that is, feature points in a 2D feature map on an xy plane are grouped, where a grouping method is similar to that of 2D. After grouping for the plane with z=0 is completed, feature points on a plane with z=1 are grouped, where a grouping method is similar to that of 2D. Then this manner follows until all feature points are grouped. Encoding and decoding implemented in this way is actually parallel on planes and serial in space.

It needs to be noted that, compared with a related technology, this solution can implement, by adjusting an encoding/decoding sequence of various feature points, parallel determining of probability distributions in a subsequent decoding process without changing periphery information available for use by each feature point. As shown in FIG. 5, similar to the related technology, only the encoding/decoding sequence is adjusted while most periphery information available for use during encoding and decoding is ensured, thereby improving encoding and decoding efficiency without degrading encoding and decoding performance.

Operation 403: Sequentially encode, based on the probability distributions of the plurality of feature points, first image features of each group of feature points in the plurality of groups into a bit stream.

In this embodiment of this application, after the plurality of feature points are divided into the plurality of groups, first image features of each group of feature points in the plurality of groups are sequentially encoded into a bit stream based on the probability distributions of the plurality of feature points. In other words, according to an encoding/decoding sequence after grouping, a group of feature points with a smaller encoding/decoding sequence number is first encoded, and then a group of feature points with a larger encoding/decoding sequence number is encoded, until the first image feature of each feature point in the plurality of feature points is encoded into the bit stream.

An implementation process of sequentially encoding, based on the probability distributions of the plurality of feature points, first image features of each group of feature points in the plurality of groups into a bit stream is: sequentially performing, based on the probability distributions of the plurality of feature points, entropy encoding on the first image features of each group of feature points in the plurality of groups, to obtain an image bit sequence corresponding to feature points in the corresponding group, and writing the image bit sequence corresponding to the feature points in the corresponding group into the bit stream. In an embodiment, image bit sequences of the plurality of feature points in the bit stream form an image bit stream.

In this embodiment of this application, entropy encoding is performed by using an entropy encoding model based on probability distributions. Entropy encoding may be performed by using one of arithmetic coding, range coding (RC), or Huffman coding. This is not limited in this embodiment of this application.

Operation 404: Encode the first hyper-prior features of the plurality of feature points into the bit stream.

In this embodiment of this application, because decoding on a decoder side needs to depend on hyper-prior features of feature points, on the encoder side, the first hyper-prior features of the plurality of feature points further need to be encoded into the bit stream. An implementation process of encoding the first hyper-prior features of the plurality of feature points into the bit stream is: encoding the first hyper-prior features of the plurality of feature points into the bit stream based on a specified probability distribution. In an implementation, entropy encoding is performed on the first hyper-prior features of the plurality of feature points based on the specified probability distribution, to obtain hyper-prior bit sequences of the plurality of feature points, and the hyper-prior bit sequences of the plurality of feature points are written into the bit stream. In other words, alternatively the first hyper-prior features may be encoded into the bit stream in an entropy encoding manner. In an embodiment, the hyper-prior bit sequences of the plurality of feature points in the bit stream form a hyper-prior bit stream, that is, the bit stream includes two parts: one part is the image bit stream, and the other part is the hyper-prior bit stream.

The specified probability distribution is a probability distribution determined in advance by using a probability distribution network model. A network structure of the probability distribution network model and a training method used for training to obtain the specified probability distribution are not limited in this embodiment of this application. For example, a network structure of the probability distribution network model may be a fully-connected network or a CNN. In addition, in this embodiment of this application, a quantity of layers included in a network structure of the probability distribution network model and a quantity of nodes at each layer are not limited either.

In this case, the encoder-side device has completed encoding of the to-be-encoded image by using operation 401 to operation 404, that is, has obtained a bit stream. It needs to be noted that, operation 402 and operation 403 may be performed in serial, that is, the feature points are grouped first and then sequentially encoded; or operation 402 and operation 403 are performed in parallel, that is, when grouping is performed in the foregoing cyclic manner, each time grouping is complete for a group, first image features of feature points in the group are encoded into the bit stream, and then a next group continues, until grouping is complete for a last group and first image features of feature points in the last group are encoded into the bit stream.

Next, with reference to FIG. 2, the encoding method provided in this embodiment of this application is described again for illustration by using the following operations 1 to 7.

Operation 1: Input a to-be-encoded image into an encoding network model, to obtain second image features y of a plurality of feature points, and quantize y to obtain first image features $\hat{y}$ of the plurality of feature points, where the first image features $\hat{y}$ are image features to be encoded into a bit stream.

Operation 2: Input the first image features $\hat{y}$ of the plurality of feature points into a hyper-encoding network model, to obtain second hyper-prior features z of the plurality of feature points, and quantize z to obtain first hyper-prior features $\hat{z}$ of the plurality of feature points.

Operation 3: Input the first hyper-prior features $\hat{z}$ into a hyper-decoding network model, to obtain prior features $\psi$ of the plurality of feature points.

Operation 4: Input the first image features $\hat{y}$ into a context model, to obtain context features $\phi$ of the plurality of feature points.

Operation 5: Obtain probability distributions of the plurality of feature points by using a probability distribution estimation model in combination with the prior features $\psi$ and the context features $\phi$.

Operation 6: Perform entropy encoding on the first prior features $\hat{z}$ based on a specified probability distribution, to obtain a hyper-prior bit stream.

Operation 7: Perform entropy encoding on the first image features $\hat{y}$, including operation a to operation c as follows:

(a) a current quantity of cycles is t;

(b) encode a first image feature of a feature point whose coordinates are (t−k*i, i), where k is a slope, and i is an integer; and (c) t=t+1. Return to operation a until the first image features of all the feature points are encoded.

It needs to be noted that, convolution in each network model involved in operation 1 to operation 7 is 2D convolution; and encoding is performed, starting from a feature point in an upper left corner, first rightward, and then gradually to a lower right corner. It is assumed that k=3, and then an encoding/decoding sequence on the encoder side is shown in FIG. 6.

In conclusion, in this embodiment of this application, for purpose of determining probability distributions in parallel in a decoding process to improve decoding efficiency, a plurality of feature points are divided into a plurality of groups based on a specified numerical value in an encoding process, and first image features of each group of feature points in the plurality of groups are sequentially encoded into a bit stream. In this way, in the decoding process, grouping is also performed in a same manner, and probability distributions of feature points in a same group are determined in parallel, to improve decoding efficiency. To be concise, this solution can break through an efficiency bottleneck caused by serial computing when decoding is performed based on a VAE, thereby effectively improving decoding efficiency.

Next, a decoding method provided in an embodiment of this application is described as follows.

Figure 11:
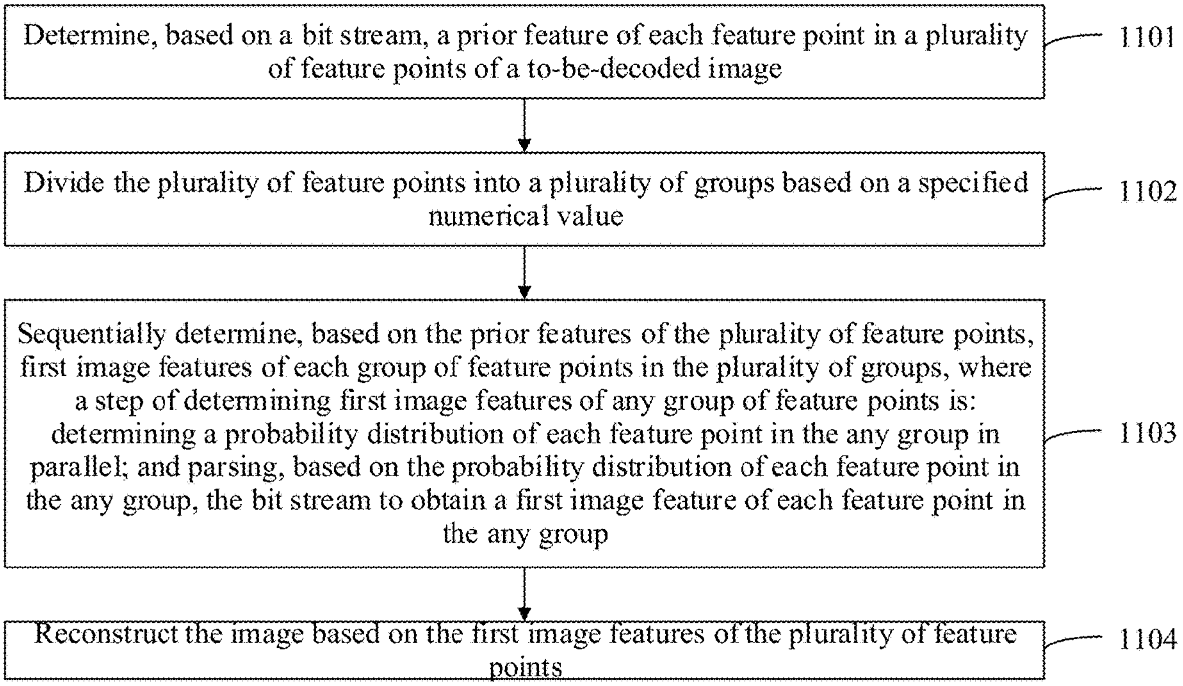
FIG. 11 is a flowchart of a decoding method according to an embodiment of this application.

Refer to FIG. 11. FIG. 11 is a flowchart of a decoding method according to an embodiment of this application. The decoding method is applied to a decoder-side device. The decoding method includes the following operations.

Operation 1101: Determine, based on a bit stream, a prior feature of each feature point in a plurality of feature points of a to-be-decoded image.

In this embodiment of this application, an implementation process of determining, based on a bit stream, a prior feature of each feature point in a plurality of feature points of a to-be-decoded image is: determining first hyper-prior features of the plurality of feature points based on the bit stream, and determining prior features of the plurality of feature points based on the first hyper-prior features of the plurality of feature points.

An implementation process of determining the first hyper-prior features of the plurality of feature points based on the bit stream may be: performing, based on a specified probability distribution, entropy decoding on the bit stream, to obtain the first hyper-prior features of the plurality of feature points. An implementation process of determining prior features of the plurality of feature points based on the first hyper-prior features of the plurality of feature points may be: inputting the first hyper-prior features of the plurality of feature points into a hyper-decoding network model, to obtain prior features that are of the plurality of feature points and that are output by the hyper-decoding network model.

Refer to FIG. 2. Entropy decoding is performed, based on the specified probability distribution on a decoder side, on a hyper-prior bit stream included in the bit stream, to obtain first hyper-prior features $\hat{z}$ of the plurality of feature points; and $\hat{z}$ is input into a hyper-decoding network model, to obtain prior features $\psi$ that are of the plurality of feature points and that are output by the hyper-decoding network model.

It needs to be noted that, the decoding method in this operation corresponds to an encoding method on an encoder side, the specified probability distribution in this operation is the same as a specified probability distribution on the encoder side, and a network structure of the hyper-decoding network model in this operation is consistent with that of a hyper-decoding network model on the encoder side.

Operation 1102: Divide the plurality of feature points into a plurality of groups based on a specified numerical value.

Similar to the encoder side, the decoder side also needs to divide the plurality of feature points into a plurality of groups based on a specified numerical value, and a grouping manner in this operation is the same as a grouping manner on the encoder side, that is, an implementation process of dividing the plurality of feature points into a plurality of groups based on a specified numerical value may be: determining a slope based on the specified numerical value, and dividing the plurality of feature points into the plurality of groups based on the slope. The specified numerical value is determined based on a size of a receptive field used by a context model, and the slope indicates a tilt degree of a straight line on which feature points to be classified into a same group are located. In an embodiment, if the context model uses a plurality of receptive fields with different sizes, the specified numerical value is determined based on a size of a largest receptive field in the plurality of receptive fields with different sizes. It needs to be noted that, for a specific implementation of grouping, refer to related descriptions in the foregoing encoding method. Details are not described herein again.

Operation 1103: Sequentially determine, based on the prior features of the plurality of feature points, first image features of each group of feature points in the plurality of groups, where a operation of determining first image features of any group of feature points is: determining a probability distribution of each feature point in the any group in parallel; and parsing, based on the probability distribution of each feature point in the any group, the bit stream to obtain a first image feature of each feature point in the any group.

In this embodiment of this application, when the plurality of feature points are divided into a plurality of groups, on the decoder side, first image features of each group of feature points in the plurality of groups are sequentially determined based on the prior features of the plurality of feature points. For each feature point in any group, a probability distribution of each feature point in the any group is determined in parallel, and then the bit stream is parsed based on the probability distribution of each feature point in the any group, to obtain a first image feature of each feature point in the any group.

For example, it is assumed that encoding/decoding sequence numbers shown in FIG. 6 are formed after grouping on the encoder side; and then the probability distribution is determined on the decoder side also according to the encoding/decoding sequence numbers shown in FIG. 6. First, a probability distribution of a feature point whose encoding/decoding sequence number is 1 is determined, then a probability distribution of a feature point whose encoding/decoding sequence number is 2 is determined, and then a probability distribution of a feature point whose encoding/decoding sequence number is 3 is determined. This goes on, until all probability distributions of the plurality of feature points are determined. It can be learned from FIG. 6 that, in this solution, probability distributions of a group of feature points having a same encoding/decoding sequence number can be determined in parallel, thereby greatly improving decoding efficiency.

The plurality of feature points include a first feature point, and an implementation of determining a probability distribution of the first feature point is: if the first feature point is a non-initial feature point in the plurality of feature points, determining periphery information of the first feature point from first image features of decoded feature points; inputting the periphery information of the first feature point into a context model, to obtain a context feature that is of the first feature point and that is output by the context model; and determining, based on a prior feature of the first feature point and the context feature of the first feature point, the probability distribution of the first feature point, where the first feature point is a feature point in the any group.

In an embodiment, the periphery information of the first feature point includes first image features of decoded feature points in a neighborhood that uses the first feature point as a geometric center, a size of the neighborhood is determined based on a size of a receptive field used by the context model, the periphery information includes at least first image features of n feature points around the first feature point, and n is greater than or equal to 4.

It needs to be noted that, the periphery information of the first feature point in the decoding method on the decoder side is the same as periphery information of a first feature point in an encoding method on the encoder side, and details are not described herein again.

In addition, if the first feature point is an initial feature point in the plurality of feature points, the probability distribution of the first feature point is determined based on the prior feature of the first feature point. An implementation process of determining the probability distribution of the first feature point on the decoder side is the same as that on the encoder side, and details are not described herein again.

Operation 1104: Reconstruct an image based on the first image features of the plurality of feature points.

In this embodiment of this application, an implementation of reconstructing the image based on the first image features of the plurality of feature points is: inputting the first image features of the plurality of feature points into a decoding network model, to obtain a reconstructed image output by the decoding network model. In this operation, a network structure of the decoding network model corresponds to that of an encoding network model on the encoder side. In other words, decoding operations in the decoding network model are a process inverse to encoding operations in the encoding network model. For example, in an encoding and decoding framework shown in FIG. 10, a network structure of a decoding network model is opposite to a network structure of an encoding network model.

In this case, the decoder-side device has finished decoding the bit stream by using operation 1101 to operation 1104, that is, has reconstructed an image. It needs to be noted that, operation 1102 and operation 1103 may be performed in serial, that is, the feature points are grouped first and then decoded in sequence; or operation 1102 and operation 1103 are performed in parallel, that is, when grouping is performed in the foregoing cyclic manner, each time grouping is complete for a group, probability distributions of feature points in the group are determined in parallel, and first image features of the feature points in the group are obtained by parsing the bit stream based on the probability distributions, and then a next group continues, until grouping is complete for a last group and first image features of feature points in the last group are obtained by parsing the bit stream.

Next, with reference to FIG. 2, the decoding method provided in this embodiment of this application is described again for illustration by using the following operations 1 to 4.

Operation 1: Read a bit stream, and perform, based on a specified probability distribution, entropy decoding on a hyper-prior bit stream included in the bit stream, to obtain hyper-prior features $\hat{z}$ of a plurality of feature points by parsing the bit stream.

Operation 2: Input the hyper-prior features $\hat{z}$ into a hyper-prior decoding network, to obtain prior features $\psi$ of the plurality of feature points.

Operation 3: Perform entropy decoding, according to the following operations a to e, on an image bit stream included in the bit stream, to obtain first image features $\hat{y}$ of the plurality of feature points as follows:

(a) a current quantity of cycles is t;

(b) input periphery information of a feature point whose coordinates are (t−k*i, i) into a context model, to obtain a context feature of the feature point whose coordinates are (t−k*i, i);

(c) obtain a probability distribution of the feature point whose coordinates are (t−k*i, i) by using a probability distribution estimation model in combination with the prior feature of and the context feature of the feature point whose coordinates are (t−k*i, i);

(d) decode the bit stream based on the probability distribution of the feature point whose coordinates are (t−k*i, i), to obtain a first image feature of the feature point whose coordinates are (t−k*i, i); and (e) t=t+1. Return to operation a until the first image features $\hat{y}$ of all the feature points are obtained through decoding.

Operation 4: Input the first image features $\hat{y}$ of the plurality of feature points into a decoding network, to obtain a reconstructed image.

It needs to be noted that, convolution in each network model involved in operation 1 to operation 4 is 2D convolution; and decoding is performed, starting from a feature point in an upper left corner, first rightward, and then gradually to a lower right corner. It is assumed that k=3, and then a decoding sequence on the decoder side is shown in FIG. 6.

To verify performance and efficiency of the encoding and decoding methods provided in embodiments of this application, experiments are separately performed on test sets Kodak and CLIC by using the encoding method provided in embodiments of this application. A resolution of a to-be-encoded image in the test set Kodak is 512*768, and a resolution of a to-be-encoded image in the test set CLIC is 2048*1367. In an experiment, a context model in encoding and decoding uses a single receptive field, and a size of the receptive field is 5*5. An experiment result of the experiment is shown in Table 1, where Ctx Serial represents encoding and decoding methods in a related technology, Ctx Parallel represents the encoding and decoding methods provided in embodiments of this application, Enc represents encoding, and Dec represents decoding. This solution has a same encoding and decoding framework as the related technology, but an encoding/decoding sequence of feature points different from that of the related technology. It can be learned that, compared with a conventional technology, this solution can greatly reduce decoding time, and encoding and decoding efficiency of this solution is higher. It needs to be noted that, because this solution does not reduce or change available periphery information compared with the related technology, encoding and decoding performance of this solution is equivalent to that of the related technology, that is, this solution does not reduce quality of a reconstructed image.

TABLE 1

| | Ctx Serial (related technology) | | Ctx Parallel (this solution) | |
|---|---|---|---|---|
| | Enc (in seconds) | Dec (in seconds) | Enc (in seconds) | Dec (in seconds) |
| Kodak (512 * 768) | 0.145 | 3.804 | 0.196 | 0.928 |
| CLIC (2048 * 1367) | 1.156 | 28.30 | 1.573 | 4.264 |

Figure 10:
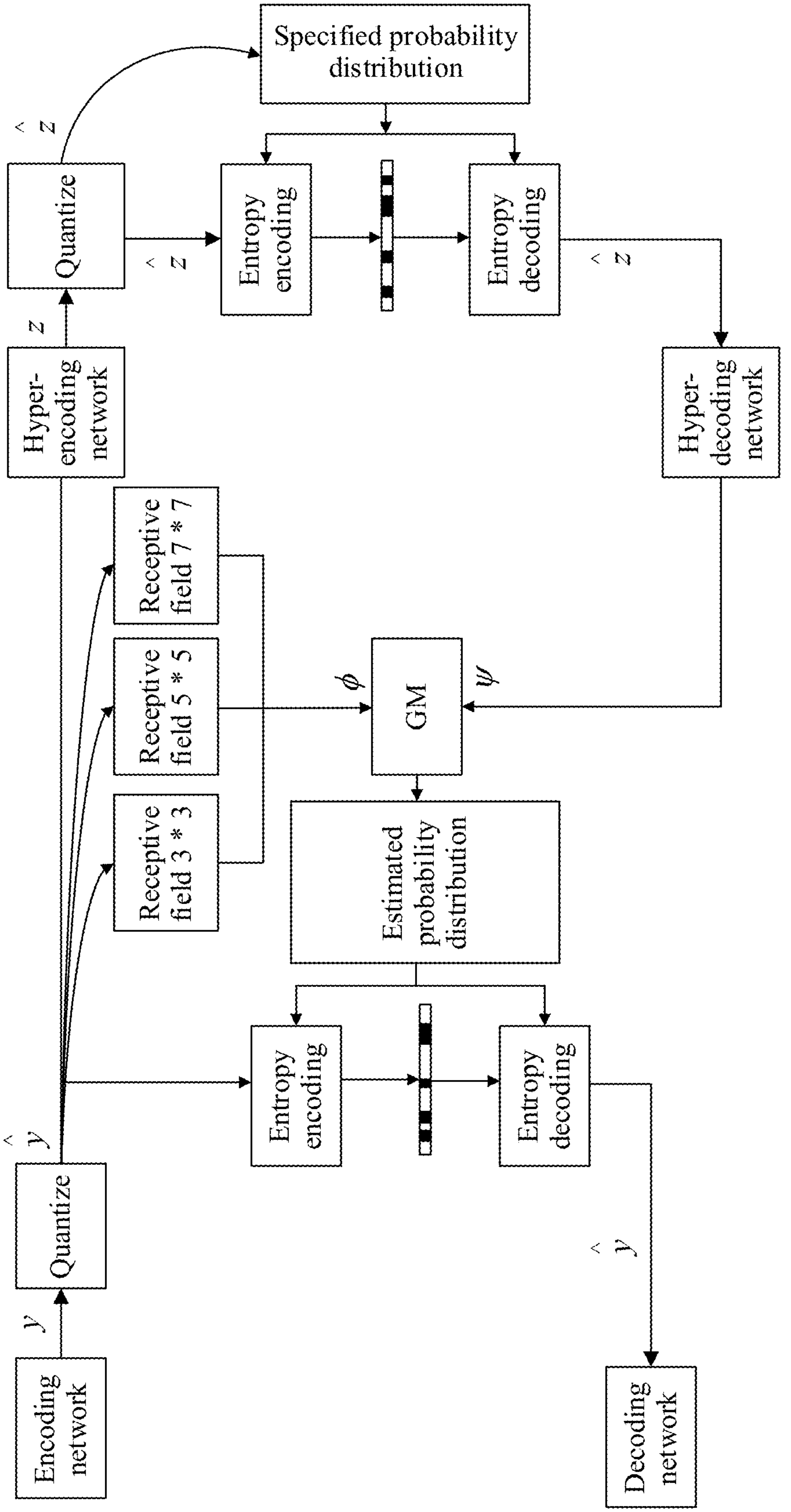
FIG. 10 is a schematic diagram of a structure of another encoding and decoding framework according to an embodiment of this application.

In another experiment, in an encoding/decoding framework as shown in FIG. 10, a context model in the encoding/decoding framework uses three receptive fields, and sizes of the three receptive fields are respectively 3*3, 5*5, and 7*7. This solution has a same encoding and decoding framework as the related technology, but an encoding/decoding sequence of feature points different from that of the related technology. An experiment result of this experiment is shown in Table 2. A ratio represents a reduction rate of encoding and decoding time by using this solution compared with the related technology, Enc-R is an encoding time reduction rate, and Dec-R is a decoding time reduction rate. A positive reduction rate indicates that time is saved, and a negative reduction rate indicates that time is increased. It can be learned that, compared with the related technology, this solution can reduce decoding time by 84.6% on the test set Kodak, and can reduce encoding time by 92% on the test set CLIC. When this solution is used, the decoding time reduction rate increases as the image resolution increases. This is because a proportion of feature points that can be decoded in parallel in a process of using this solution increases as the image resolution increases.

$$\text{Ratio} = \frac{(t_p - t_s)}{t_s} * 100\%,$$

where $t_s$ represents an encoding time with the related technology, and $t_p$ represents an encoding time with this solution; or $t_s$ represents a decoding time with the related technology, and $t_p$ represents a decoding time with this solution.

TABLE 2

| | Ctx Serial (related technology) | | Ctx Parallel (this solution) | | Ratio | |
|---|---|---|---|---|---|---|
| | Enc (in seconds) | Dec (in seconds) | Enc (in seconds) | Dec (in seconds) | Enc-R | Dec-R |
| Kodak (512 * 768) | 0.157 | 15.94 | 0.196 | 0.928 | 49.0% | −84.6% |
| CLIC (2048 * 1367) | 1.053 | 124.7 | 1.573 | 4.264 | 32.0% | −92.0% |

It can be learned from the foregoing description that, this solution is actually a parallelization method for performing, by using context features, entropy encoding based on probability distributions. Compared with the related technology, a decoding time is greatly reduced without changing available periphery information. In addition, the reduction rates of encoding and decoding time increase as the image resolution increases; and the reduction rates of encoding and decoding time increase as complexity of the context model increases (for example, with more receptive fields). In a multi-layer context model and a multi-layer probability distribution estimation model, this solution can cut down on the time to almost one tenth, compared with the related technology. In addition, in this solution, a method of the related technology does not need to be changed on the whole, and therefore, a network model in an encoding and decoding framework does not need to be retrained. In other words, this solution is more convenient for application, and does not reduce encoding and decoding performance.

In conclusion, in this embodiment of this application, in a decoding process, a plurality of feature points are divided into a plurality of groups based on a specified numerical value, and probability distributions of feature points in a same group are determined in parallel, to improve decoding efficiency. To be concise, this solution can break through an efficiency bottleneck caused by serial computing when decoding is performed based on a VAE, thereby effectively improving decoding efficiency.

Figure 12:
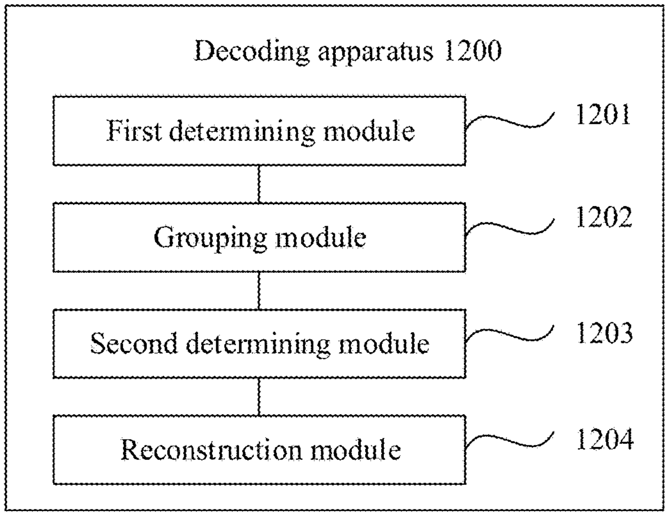
FIG. 12 is a schematic diagram of a structure of a decoding apparatus according to an embodiment of this application.

FIG. 12 is a schematic diagram of a structure of a decoding apparatus 1200 according to an embodiment of this application. The decoding apparatus 1200 may be implemented as a part of a decoder-side device or as an entire decoder-side device by using software, hardware, or a combination thereof. The decoder-side device may be the source apparatus shown in FIG. 1. Refer to FIG. 12, the apparatus 1200 includes: a first determining module 1201, a grouping module 1202, a second determining module 1203, and a reconstruction module 1204, where the first determining module 1201 is configured to determine, based on a bit stream, a prior feature of each feature point in a plurality of feature points of a to-be-decoded image;

the grouping module 1202 is configured to divide the plurality of feature points into a plurality of groups based on a specified numerical value;

the second determining module 1203 is configured to sequentially determine, based on the prior features of the plurality of feature points, first image features of each group of feature points in the plurality of groups, where determining first image features of any group of feature points is: determining a probability distribution of each feature point in the any group in parallel; and parsing, based on the probability distribution of each feature point in the any group, the bit stream to obtain a first image feature of each feature point in the any group; and the reconstruction module 1204 is configured to reconstruct the image based on the first image features of the plurality of feature points.

In an embodiment, the plurality of feature points include a first feature point, and the second determining module 1203 includes:

a first processing submodule, configured to: if the first feature point is a non-initial feature point in the plurality of feature points, determine periphery information of the first feature point from first image features of decoded feature points, where the first feature point is a feature point in the any group;

a second processing submodule, configured to input the periphery information of the first feature point into a context model, to obtain a context feature that is of the first feature point and that is output by the context model; and a third processing submodule, configured to determine, based on a prior feature of the first feature point and the context feature of the first feature point, the probability distribution of the first feature point.

In an embodiment, the periphery information of the first feature point includes first image features of decoded feature points in a neighborhood that uses the first feature point as a geometric center, a size of the neighborhood is determined based on a size of a receptive field used by the context model, the periphery information includes at least first image features of n feature points around the first feature point, and n is greater than or equal to 4.

In an embodiment, the plurality of feature points include a first feature point, and the second determining module 1203 includes:

a fourth processing submodule, configured to: if the first feature point is an initial feature point in the plurality of feature points, determine the probability distribution of the first feature point based on the prior feature of the first feature point.

In an embodiment, the specified numerical value is determined based on a size of a receptive field used by the context model; and the grouping module 1202 includes:

a first determining submodule, configured to determine a slope based on the specified numerical value, where the slope indicates a tilt degree of a straight line on which feature points to be divided into a same group are located; and a division submodule, configured to divide the plurality of feature points into the plurality of groups based on the slope.

In an embodiment, if the context model uses a plurality of receptive fields with different sizes, the specified numerical value is determined based on a size of a largest receptive field in the plurality of receptive fields with different sizes.

In an embodiment, the receptive field used by the context model includes a receptive field whose size is 5*5.

In conclusion, in this embodiment of this application, in a decoding process, a plurality of feature points are divided into a plurality of groups based on a specified numerical value, and probability distributions of feature points in a same group are determined in parallel, to improve decoding efficiency. To be concise, this solution can break through an efficiency bottleneck caused by serial computing when decoding is performed based on a VAE, thereby effectively improving decoding efficiency.

It needs to be noted that, when the decoding apparatus provided in the foregoing embodiment performs decoding, division of the foregoing functional modules is merely used as an example for description. In actual application, the foregoing functions may be allocated to different functional modules for implementation based on a requirement. In other words, an internal structure of the apparatus is divided into different functional modules, to implement all or some of the foregoing described functions. In addition, the decoding apparatus provided in the foregoing embodiment has a same concept as the decoding method embodiment. For details about a specific implementation process of the decoding apparatus, refer to the decoding method embodiment. Details are not described herein again.

Figure 13:
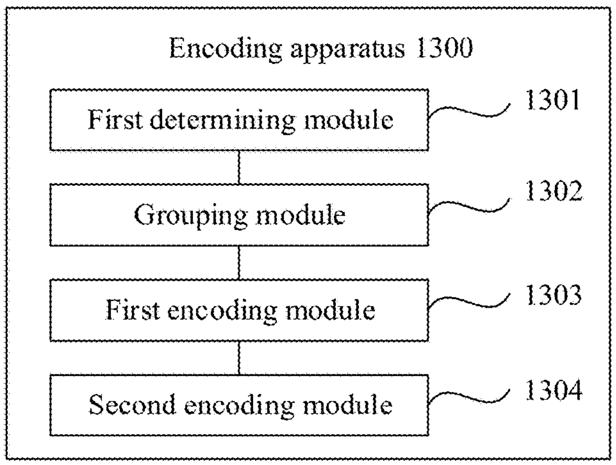
FIG. 13 is a schematic diagram of a structure of an encoding apparatus according to an embodiment of this application.

FIG. 13 is a schematic diagram of a structure of an encoding apparatus 1300 according to an embodiment of this application. The encoding apparatus 1300 may be implemented as a part of an encoder-side device or as an entire encoder-side device by using software, hardware, or a combination thereof. The encoder-side device may be the destination apparatus shown in FIG. 1. Refer to FIG. 13, the apparatus 1300 includes: a first determining module 1301, a grouping module 1302, a first encoding module 1303, and a second encoding module 1304, where the first determining module 1301 is configured to determine, based on a to-be-encoded image, a first image feature, a probability distribution, and a first hyper-prior feature of each feature point in a plurality of feature points of the image;

the grouping module 1302 is configured to divide the plurality of feature points into a plurality of groups based on a specified numerical value;

the first encoding module 1303 is configured to sequentially encode, based on the probability distributions of the plurality of feature points, first image features of each group of feature points in the plurality of groups into a bit stream; and the second encoding module 1304 is configured to encode the first hyper-prior features of the plurality of feature points into the bit stream.

In an embodiment, the first determining module 1301 includes:

a first determining submodule, configured to determine, based on the image, first image features of the plurality of feature points; and a second determining submodule, configured to: determine, based on the first image features of the plurality of feature points, first hyper-prior features of the plurality of feature points, and determine the probability distribution of each feature point in the plurality of feature points in parallel.

In an embodiment, the plurality of feature points include a first feature point, and the second determining submodule is configured to:

if the first feature point is a non-initial feature point in the plurality of feature points, determine a prior feature of the first feature point based on the first image feature of the first feature point, where the first feature point is one of the plurality of feature points;

determine periphery information of the first feature point from the first image features of the plurality of feature points;

input the periphery information of the first feature point into a context model, to obtain a context feature that is of the first feature point and that is output by the context model; and determine, based on a prior feature of the first feature point and the context feature of the first feature point, the probability distribution of the first feature point.

In an embodiment, the plurality of feature points include a first feature point, and the second determining submodule is configured to:

if the first feature point is an initial feature point in the plurality of feature points, determine the probability distribution of the first feature point based on a prior feature of the first feature point.

In an embodiment, the specified numerical value is determined based on a size of a receptive field used by the context model; and the grouping module 1302 includes:

a third determining submodule, configured to determine a slope based on the specified numerical value, where the slope indicates a tilt degree of a straight line on which feature points to be divided into a same group are located; and a division submodule, configured to divide the plurality of feature points into the plurality of groups based on the slope.

In an embodiment, if the context model uses a plurality of receptive fields with different sizes, the specified numerical value is determined based on a size of a largest receptive field in the plurality of receptive fields with different sizes.

In an embodiment, the receptive field used by the context model includes a receptive field whose size is 5*5.

In conclusion, in this embodiment of this application, for purpose of determining probability distributions in parallel in a decoding process to improve decoding efficiency, a plurality of feature points are divided into a plurality of groups based on a specified numerical value in an encoding process, and first image features of each group of feature points in the plurality of groups are sequentially encoded into a bit stream. In this way, in the decoding process, grouping is also performed in a same manner, and probability distributions of feature points in a same group are determined in parallel, to improve decoding efficiency. To be concise, this solution can break through an efficiency bottleneck caused by serial computing when decoding is performed based on a VAE, thereby effectively improving decoding efficiency.

It needs to be noted that, when the encoding apparatus provided in the foregoing embodiment performs encoding, division of the foregoing functional modules is merely used as an example for description. In actual application, the foregoing functions may be allocated to different functional modules for implementation based on a requirement. In other words, an internal structure of the apparatus is divided into different functional modules, to implement all or some of the foregoing described functions. In addition, the encoding apparatus provided in the foregoing embodiment has a same concept as the encoding method embodiment. For details about a specific implementation process of the encoding apparatus, refer to the encoding method embodiment. Details are not described herein again.

Figure 14:
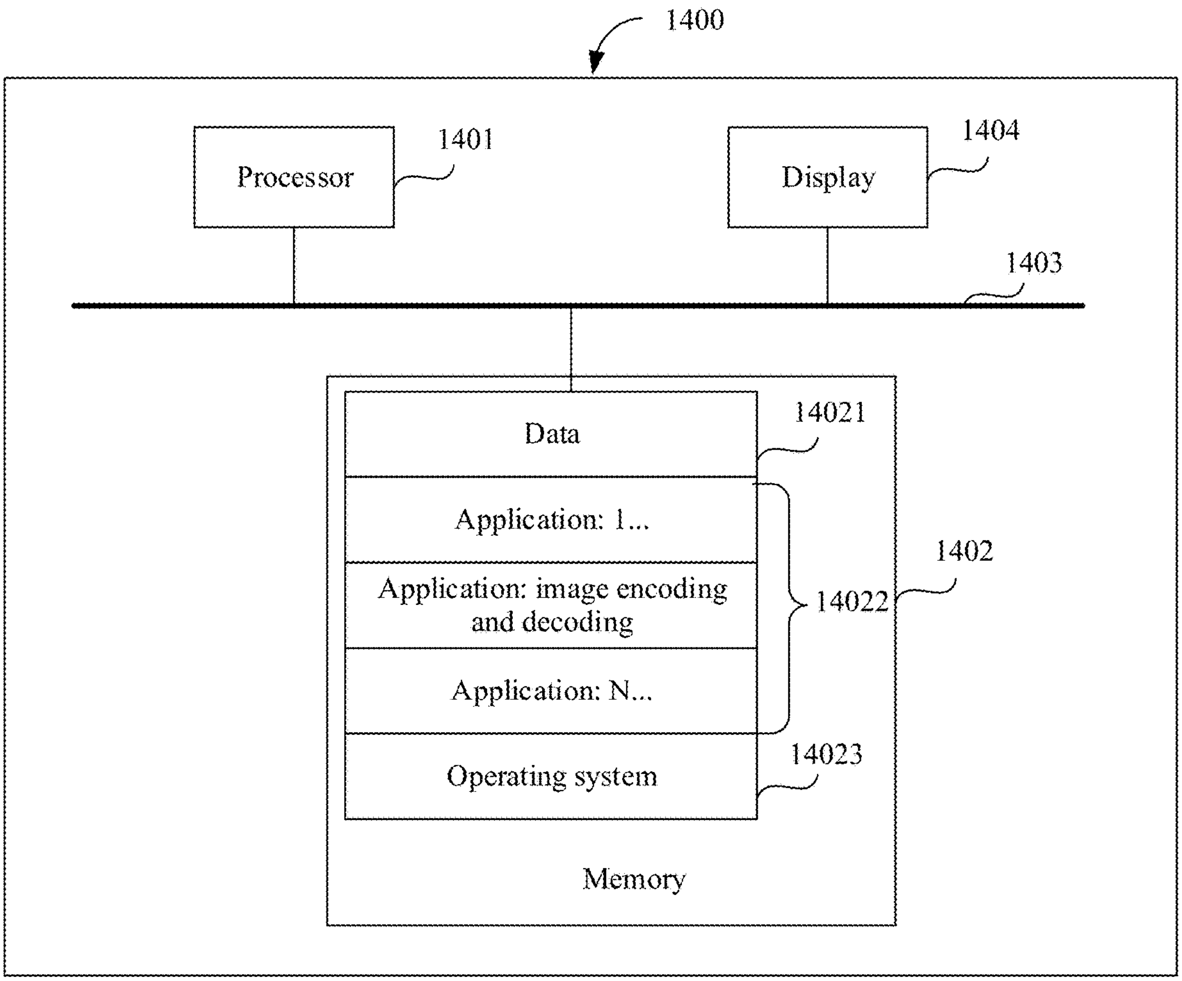
FIG. 14 is a schematic block diagram of an encoding and decoding apparatus according to an embodiment of this application.

FIG. 14 is a schematic block diagram of an encoding and decoding apparatus 1400 according to an embodiment of this application. The encoding and decoding apparatus 1400 may include a processor 1401, a memory 1402, and a bus system 1403. The processor 1401 and the memory 1402 are connected through the bus system 1403. The memory 1402 is configured to store instructions. The processor 1401 is configured to execute the instructions stored in the memory 1402, to perform the encoding or decoding method described in embodiments of this application. To avoid repetition, details are not described herein again.

In this embodiment of this application, the processor 1401 may be a central processing unit (CPU), or the processor 1401 may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

The memory 1402 may include a ROM device or a RAM device; or any other proper type of storage device may be used as the memory 1402. The memory 1402 may include code and data 14021 that are accessed by the processor 1401 through the bus system 1403. The memory 1402 may further include an operating system 14023 and an application 14022. The application 14022 includes at least one program that enables the processor 1401 to perform the encoding or decoding method described in embodiments of this application. For example, the application 14022 may include applications 1 to N, and may further include an encoding or decoding application (a codec application for short) that performs the encoding or decoding method described in embodiments of this application.

The bus system 1403 may include a power bus, a control bus, a status signal bus, and the like, in addition to a data bus. However, for clear description, various types of buses in FIG. 14 are collectively referred to as the bus system 1403.

In an embodiment, the encoding and decoding apparatus 1400 may further include one or more output devices, such as a display 1404. In an example, the display 1404 may be a touch display that combines a display and a touch unit that operably senses touch input. The display 1404 may be connected to the processor 1401 through the bus system 1403.

It needs to be noted that the encoding and decoding apparatus 1400 may perform the encoding method in embodiments of this application, and still may perform the decoding method in embodiments of this application.

A person skilled in the art can understand that the functions described with reference to various illustrative logical blocks, modules, and algorithm operations disclosed and described in this specification may be implemented by hardware, software, firmware, or any combination thereof. If the functions are implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium (for example, based on a communications protocol) that facilitates transfer of a computer program from one place to another place. In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

In an example but not a limitation, such computer-readable storage media may include a RAM, a ROM, an EEPROM, a CD-ROM or another compact disc storage apparatus, a magnetic disk storage apparatus or another magnetic storage apparatus, a flash memory, or any other computer-accessible medium that can be used to store desired program code in a form of instructions or a data structure. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology (such as infrared, radio, or microwave), the coaxial cable, the optical fiber, the twisted pair, the DSL, or the wireless technology (such as infrared, radio, or microwave) is included in a definition of the medium. However, it needs to be understood that the computer-readable storage medium and the data storage medium do not include connections, carriers, signals, or other transitory media, but actually mean non-transitory tangible storage media. A disk and an optical disc used in this specification include a compact disc (CD), a laser disc, an optical disc, a DVD, and a Blu-ray disc, where the disk generally magnetically reproduces data, and the optical disc optically reproduces data by using laser. Combinations of the foregoing items shall also be included in the scope of the computer-readable media.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements. In an example, various illustrative logic blocks, units, and modules in the encoder 100 and the decoder 200 may be understood as corresponding circuit devices or logic elements.

The technologies in embodiments of this application may be implemented in various apparatuses or devices, including a wireless handset, an integrated circuit (IC), or a set of ICs (for example, a chip set). Various components, modules, or units are described in embodiments of this application to emphasize functional aspects of the apparatuses configured to perform the disclosed technologies, but are not necessarily implemented by different hardware units. Actually, as described previously, various units may be combined into a codec hardware unit in combination with appropriate software and/or firmware, or may be provided by interoperable hardware units (including the one or more processors described previously).

In other words, all or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a digital versatile disc (DVD)), or a semi-conductor medium (for example, a solid state disk (SSD)), or the like. It needs to be noted that the computer-readable storage medium mentioned in embodiments of this application may be a non-volatile storage medium, that is, may be a non-transitory storage medium.

It needs to be understood that "a plurality of" in this specification means two or more. In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It needs to be noted that information (including but not limited to device information about a user, personal information about a user, and the like), data (including but not limited to data used for analysis, stored data, displayed data, and the like), and signals in embodiments of this application are all authorized by the user or fully authorized by all parties; and collection, use, and processing of related data need to comply with related laws, regulations, and standards of related countries and regions. For example, an image, a video, and the like in embodiments of this application are obtained when sufficient authorization is obtained.

The foregoing descriptions are merely embodiments of this application, but are not intended to limit this application. Any modification, equivalent replacement, or improvement made without departing from the spirit and principle of this application shall fall within the protection scope of this application.

What is claimed is:

1. A decoding method, comprising:

determining a prior feature of each feature point in a plurality of feature points of a to-be-decoded image based on a bitstream;

determining a slope based on a specified numerical value, wherein the slope indicates a tilt degree of a straight line on which feature points to be divided into a same group are located, and the specified numerical value is determined based on a size of a receptive field used by a context model;

dividing the plurality of feature points into a plurality of groups of feature points based on the slope;

sequentially determining first image features of each group of feature points in the plurality of groups based on the prior features of the plurality of feature points, wherein sequentially determining the first image features of each group of feature points in the plurality of groups comprises: determining a probability distribution of each feature point in the group of feature points in parallel, and parsing the bitstream to obtain a first image feature of each feature point in the group of feature points based on the probability distribution of each feature point in the group of feature points; and reconstructing the to-be-decoded image based on the first image features of the plurality of feature points;

wherein when the context model uses a single receptive field, the specified numerical value is determined based on a size of the single receptive field, and when the context model uses a plurality of receptive fields with different sizes, the specified numerical value is determined based on a size of a largest receptive field in the plurality of receptive fields with different sizes.

2. The decoding method according to claim 1, wherein the group of feature points comprises a first feature point; and determining the probability distribution of each feature point in the group of feature points in parallel comprises:

in response to determining that the first feature point is a non-initial feature point in the plurality of feature points, determining periphery information of the first feature point from first image features of decoded feature points;

inputting the periphery information of the first feature point into a context model, to obtain a context feature of the first feature point; and determining the probability distribution of the first feature point based on a prior feature of the first feature point and the context feature of the first feature point.

3. The decoding method according to claim 2, wherein the periphery information of the first feature point comprises first image features of decoded feature points in a neighborhood that uses the first feature point as a geometric center, a size of the neighborhood is determined based on the size of the receptive field used by the context model, the periphery information comprises at least first image features of n feature points around the first feature point, and n is an integer greater than or equal to 4.

4. The decoding method according to claim 1, wherein the plurality of feature points comprise a first feature point; and determining the probability distribution of the first feature point comprises:

in response to determining that the first feature point is an initial feature point in the plurality of feature points, determining the probability distribution of the first feature point based on a prior feature of the first feature point.

5. An encoding method, comprising:

determining a first image feature, a probability distribution, and a first hyper-prior feature of each feature point in a plurality of feature points of a to-be-encoded image;

determining a slope based on a specified numerical value, wherein the slope indicates a tilt degree of a straight line on which feature points to be divided into a same group are located, and the specified numerical value is determined based on a size of a receptive field used by a context model;

dividing the plurality of feature points into a plurality of groups of feature points based on the slope;

sequentially encoding first image features of each group of feature points in the plurality of groups of feature points into a bitstream based on the probability distributions of the plurality of feature points; and encoding the first hyper-prior features of the plurality of feature points into the bitstream;

wherein when the context model uses a single receptive field, the specified numerical value is determined based on a size of the single receptive field, and when the context model uses a plurality of receptive fields with different sizes, the specified numerical value is determined based on a size of a largest receptive field in the plurality of receptive fields with different sizes.

6. The encoding method according to claim 5, wherein determining the first image feature, the probability distribution, and the first hyper-prior feature of each feature point in a plurality of feature points of the to-be-encoded image comprises:

determining first image features of the plurality of feature points; and determining the first hyper-prior features of the plurality of feature points and determining the probability distribution of each feature point in the plurality of feature points in parallel based on the first image features of the plurality of feature points.

7. The encoding method according to claim 6, wherein the plurality of feature points comprise a first feature point; and determining the probability distribution of the first feature point comprises:

in response to determining that the first feature point is a non-initial feature point in the plurality of feature points, determining a prior feature of the first feature point based on the first image feature of the first feature point;

determining periphery information of the first feature point from the first image features of the plurality of feature points;

inputting the periphery information of the first feature point into the context model, to obtain a context feature of the first feature point; and determining the probability distribution of the first feature point based on the prior feature of the first feature point and the context feature of the first feature point.

8. The encoding method according to claim 6, wherein the plurality of feature points comprise a first feature point; and determining the probability distribution of the first feature point comprises:

in response to determining that the first feature point is an initial feature point in the plurality of feature points, determining the probability distribution of the first feature point based on a prior feature of the first feature point.

9. A decoding apparatus, comprising:

one or more processors; and one or more memories coupled to the one or more processors to store instructions, which when executed by the one or more processors, cause the decoding apparatus to perform operations, the operations comprising:

determining a prior feature of each feature point in a plurality of feature points of a to-be-decoded image based on a bitstream;

determining a slope based on a specified numerical value, wherein the slope indicates a tilt degree of a straight line on which feature points to be divided into a same group are located, and the specified numerical value is determined based on a size of a receptive field used by a context model;

dividing the plurality of feature points into a plurality of groups of feature points based on the slope;

sequentially determining first image features of each group of feature points in the plurality of groups of feature points based on the prior features of the plurality of feature points, wherein sequentially determining the first image features of each group of feature points in the plurality of groups comprises: determining a probability distribution of each feature point in a group of feature points in parallel; and parsing the bitstream to obtain a first image feature of each feature point in the group of feature points based on the probability distribution of each feature point in the group of feature points; and reconstructing the to-be-decoded image based on the first image features of the plurality of feature points;

wherein when the context model uses a single receptive field, the specified numerical value is determined based on a size of the single receptive field, and when the context model uses a plurality of receptive fields with different sizes, the specified numerical value is determined based on a size of a largest receptive field in the plurality of receptive fields with different sizes.

10. The decoding apparatus according to claim 9, wherein the group of feature points comprises a first feature point; and determining the probability distribution of each feature point in the group of feature points in parallel comprises:

in response to determining that the first feature point is a non-initial feature point in the plurality of feature points, determining periphery information of the first feature point from first image features of decoded feature points;

inputting the periphery information of the first feature point into a context model, to obtain a context feature of the first feature point; and determining the probability distribution of the first feature point based on a prior feature of the first feature point and the context feature of the first feature point.

11. The decoding apparatus according to claim 10, wherein the periphery information of the first feature point comprises first image features of decoded feature points in a neighborhood that uses the first feature point as a geometric center, a size of the neighborhood is determined based on the size of the receptive field used by the context model, the periphery information comprises at least first image features of n feature points around the first feature point, and n is an integer greater than or equal to 4.

12. The decoding apparatus according to claim 9, wherein the plurality of feature points comprise a first feature point; and determining the probability distribution of the first feature point comprises:

in response to determining that the first feature point is an initial feature point in the plurality of feature points, determining the probability distribution of the first feature point based on the prior feature of the first feature point.

13. A non-transitory storage medium having a bitstream and instructions stored therein, wherein when the instructions are executed by at least one processor, the instructions cause the at least one processor to perform operations, the operations comprising:

determining a prior feature of each feature point in a plurality of feature points of a to-be-decoded image based on a bitstream;

determining a slope based on a specified numerical value, wherein the slope indicates a tilt degree of a straight line on which feature points to be divided into a same group are located, and the specified numerical value is determined based on a size of a receptive field used by a context model;

dividing the plurality of feature points into a plurality of groups of feature points based on the slope;

sequentially determining first image features of each group of feature points in the plurality of groups based on the prior features of the plurality of feature points, wherein sequentially determining the first image features of each group of feature points in the plurality of groups comprises: determining a probability distribution of each feature point in a group of feature points in parallel; and parsing the bitstream to obtain a first image feature of each feature point in the group of feature points based on the probability distribution of each feature point in the group of feature points; and reconstructing the to-be-decoded image based on the first image features of the plurality of feature points;

wherein when the context model uses a single receptive field, the specified numerical value is determined based on a size of the single receptive field, and when the context model uses a plurality of receptive fields with different sizes, the specified numerical value is determined based on a size of a largest receptive field in the plurality of receptive fields with different sizes.

* * * * *